US008972370B2

(12) United States Patent (10) Patent No.: US 8,972,370 B2
Tsuruta et al. (45) Date of Patent: Mar. 3, 2015

(54) REPETITIVE FUSION SEARCH METHOD FOR SEARCH SYSTEM

(75) Inventors: Setsuo Tsuruta, Tokyo (JP); Yoshitaka Sakurai, Tokyo (JP)

(73) Assignee: Tokyo Denki University, Tokyo (JP)

( * ) Notice: Subject to any disclaimer, the term of this patent is extended or adjusted under 35 U.S.C. 154(b) by 1499 days.

(21) Appl. No.: 12/196,086

(22) Filed: Aug. 21, 2008

(65) Prior Publication Data

US 2010/0036802 A1 Feb. 11, 2010

(30) Foreign Application Priority Data

Aug. 5, 2008 (JP) ................................. 2008-201434

(51) Int. Cl.
*G06Q 30/06* (2012.01)
*G06F 17/30* (2006.01)

(52) U.S. Cl.
CPC ...... *G06F 17/30864* (2013.01); *G06Q 30/0603* (2013.01)
USPC ........... 707/706; 707/732; 707/734; 707/751; 707/766; 707/768

(58) Field of Classification Search
USPC ......... 707/706, 758, 768, 784, 723, 732–734, 707/751
See application file for complete search history.

(56) References Cited

U.S. PATENT DOCUMENTS

| | | | | |
|---|---|---|---|---|
| 5,410,692 A | * | 4/1995 | Torres | 707/999.003 |
| 5,583,763 A | * | 12/1996 | Atcheson et al. | 707/750 |
| 5,864,846 A | * | 1/1999 | Voorhees et al. | 1/1 |
| 5,926,808 A | * | 7/1999 | Evans et al. | 1/1 |
| 6,278,401 B1 | * | 8/2001 | Wigren | 342/195 |
| 6,539,395 B1 | * | 3/2003 | Gjerdingen et al. | 1/1 |
| 7,243,104 B2 | * | 7/2007 | Bill | 1/1 |
| 7,610,255 B2 | * | 10/2009 | Willcock | 706/47 |
| 7,788,273 B2 | * | 8/2010 | Torres et al. | 707/758 |
| 7,818,314 B2 | * | 10/2010 | Chowdhury et al. | 707/722 |
| 7,987,169 B2 | * | 7/2011 | Epstein | 707/706 |
| 2001/0049680 A1 | * | 12/2001 | Yanagimoto | 707/10 |
| 2003/0033324 A1 | * | 2/2003 | Golding | 707/200 |
| 2004/0267774 A1 | * | 12/2004 | Lin et al. | 707/100 |
| 2005/0261989 A1 | * | 11/2005 | Vadon et al. | 705/27 |
| 2006/0026147 A1 | * | 2/2006 | Cone et al. | 707/3 |
| 2006/0173817 A1 | * | 8/2006 | Chowdhury et al. | 707/3 |
| 2006/0224562 A1 | * | 10/2006 | Yan et al. | 707/2 |
| 2007/0219979 A1 | * | 9/2007 | Jung et al. | 707/5 |

(Continued)

FOREIGN PATENT DOCUMENTS

| | | |
|---|---|---|
| JP | 2001-184356 A | 7/2001 |
| JP | 2004-341784 A | 12/2004 |

(Continued)

*Primary Examiner* — Srirama Channavajjala
(74) *Attorney, Agent, or Firm* — Foley & Lardner LLP

(57) ABSTRACT

Provided in the present invention is a repetitive fusion search method for a search system, in which: a search interface 20 displays parameter numerical value setting fields 25 for setting a numerical value for each of multiple instinct based feature parameters in order to input instinct based rating information, and a text input field 24 and a keyword selection field 26 for inputting keywords; and a search engine 13 searches, in response to search inputs input by a searcher using the search interface, a search target database 11 based on the keywords and extracts relevant targets, determines priority for the relevant targets based on the instinct based rating information, and transmits the relevant targets to the search interface 20.

17 Claims, 23 Drawing Sheets

(56) References Cited

U.S. PATENT DOCUMENTS

| | | | |
|---|---|---|---|
| 2007/0239741 A1* | 10/2007 | Jordahl | 707/100 |
| 2007/0255696 A1* | 11/2007 | Desbarats | 707/3 |
| 2008/0086451 A1* | 4/2008 | Torres et al. | 707/3 |
| 2008/0140617 A1* | 6/2008 | Torres et al. | 707/3 |
| 2008/0294534 A1 | 11/2008 | Brown et al. | |
| 2009/0006216 A1* | 1/2009 | Blumenthal et al. | 705/26 |
| 2009/0019008 A1 | 1/2009 | Moore et al. | |
| 2009/0112836 A1* | 4/2009 | Ishitani et al. | 707/5 |
| 2009/0119263 A1* | 5/2009 | Jones et al. | 707/3 |
| 2009/0327236 A1* | 12/2009 | Denney et al. | 707/3 |
| 2010/0299201 A1* | 11/2010 | Thrasher | 705/14.49 |

FOREIGN PATENT DOCUMENTS

| | | | | |
|---|---|---|---|---|
| JP | 2007-286852 A | | 11/2007 | |
| JP | 4129132 B2 | | 8/2008 | |
| JP | 2010039731 A | * | 2/2010 | G06F 17/30 |
| JP | 4876706 B2 | | 2/2012 | |
| WO | WO 2005/109180 | * | 11/2005 | |
| WO | WO-2005/111886 | | 11/2005 | |

* cited by examiner

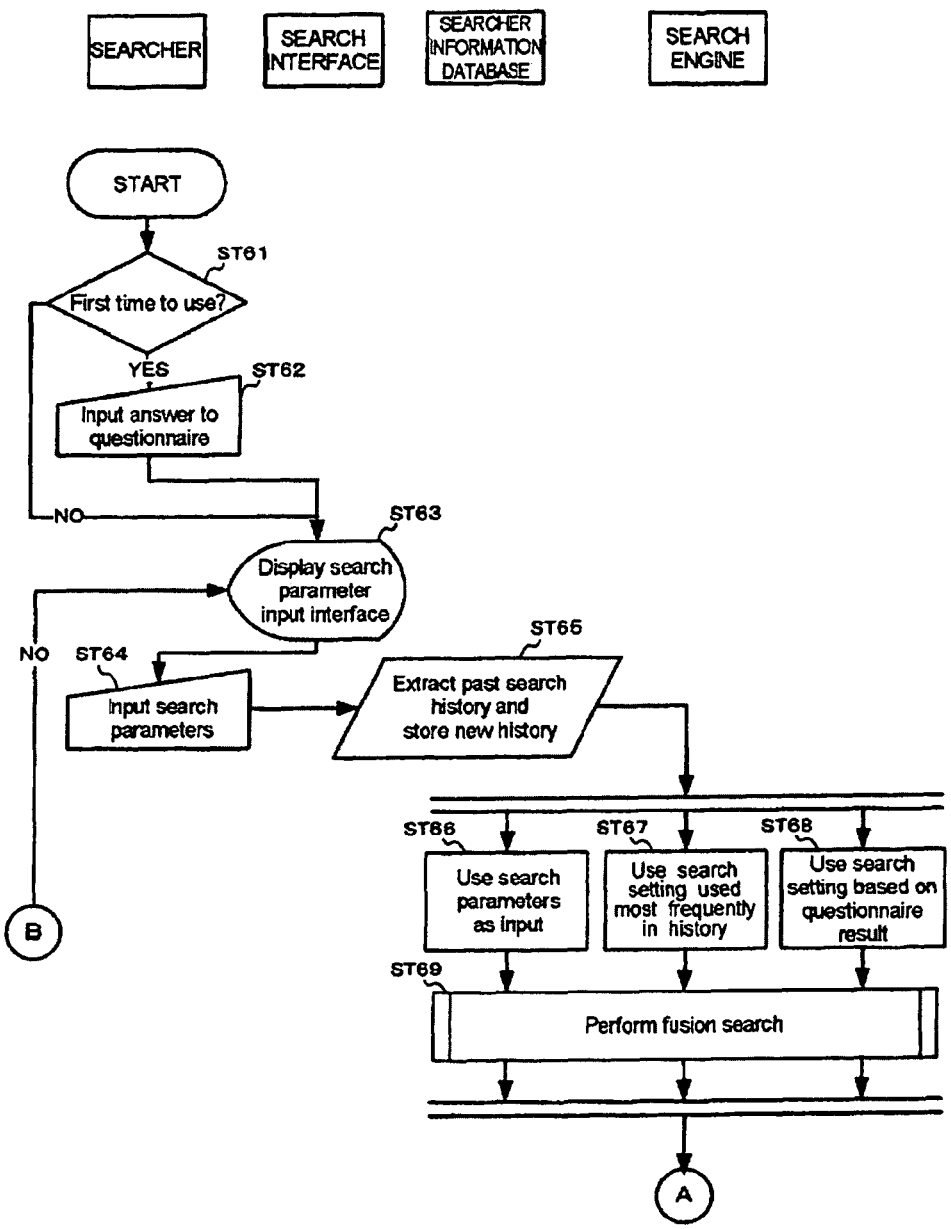

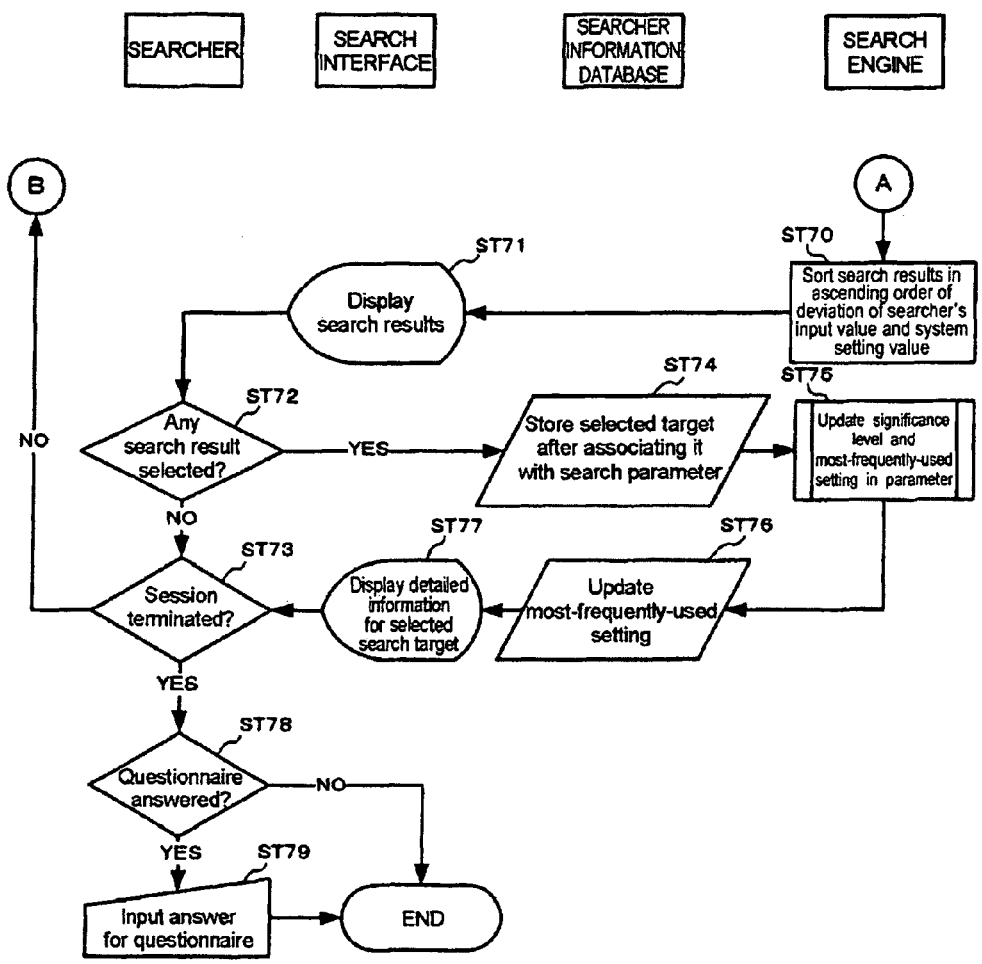

FIG.16

SEARCH INTERFACE

LOW 25 HIGH

☑ SWEET
☑ SPICY
☑ FRUITY
☑ SEXY
☑ FRESH

FREE WORD 24
[INPUT TEXT]

MANUFACTURER 26
NAME
[SELECT ⌄]
CELEBRITY WHO USES
SAME PERFUME
[SELECT ⌄]
RELEASE TIME
[SELECT ⌄]
PRICE RANGE
[SELECT ⌄]

[SEARCH] 27

| SEARCH INTERFACE | | | | 28 |
|---|---|---|---|---|

LOW 25B 25A HIGH

☑ SWEET

☑ SPICY

☑ FRUITY

☑ SEXY

☑ FRESH

MANUFACTURER NAME 26
SELECT

CELEBRITY WHO USES SAME PERFUME
SELECT

RELEASE TIME
SELECT

PRICE RANGE
SELECT

FREE WORD 24
INPUT TEXT

29

SEARCH 27

| IMAGE | MANUFACTURER NAME/ ARTICLE NAME | INSTINCT BASED PARAMETER | PRICE |
|---|---|---|---|
|  |  |  |  |
|  |  |  |  |
|  |  |  |  |
|  |  |  |  |

RECOMMENDED ARTICLE

DISPLAY OF RELATING ARTICLES

REPETITIVE FUSION SEARCH METHOD FOR SEARCH SYSTEM

CROSS-REFERENCES TO RELATED APPLICATIONS

The entire disclosure of Japanese Patent Application No. 2008-201434, filed on Aug. 5, 2008, is expressly incorporated herein by reference.

BACKGROUND

1. Technical field

The invention relates to a repetitive fusion search method for a search system.

2. Related Art

In over-the-counter sales for cosmetics, sales people have often talked with customers face-to-face, asked each customer about their needs, and proposed an article that meets them. Although this sales method provides an advantage in which an article that best matches a customer's needs can be proposed to the customer, it provides disadvantages in that salespeople have to have face-to-face communication with customers, so the employment cost for all of those salespeople is required and thus articles tend to be expensive. In addition, the salespeople only serve in their business hours, so customers cannot purchase their desired articles anytime and anywhere.

Meanwhile, major data searches include a keyword search using text and an instinct based search in which numerical value rating is given to each instinct based feature parameter for performing a search. For example, when cosmetics are sold online, customer needs need to be understood in detail so that an article that most meets the customer's needs can be extracted, proposed to the customer and purchased by the customer. However, understanding customer's needs in detail using the above key word search and instinct based search and extracting and proposing an article that most meets the customers needs based on the information has had a limitation and it has been difficult to realize online sales that achieve a high customer satisfaction level. In particular, in conventional instinct based searches, there is a deviation of customers' criterion for setting each instinct based feature parameter based on their instincts from a database creator's criterion for setting it, so the results desired by customers have not always been obtained. For example, even if a customer selects "a light color" for a certain article, the "light color" does not always match a manufacturer's "light color."

Another recommendation system for online sales is also known (Patent Document 1: JP2004-341784 A). In this conventional recommendation system, even if a user searching for an article cannot find the article that he/she searches for, the system proposes articles that appear to suit the costumer's taste by proposing articles that have been checked by other users who selected similar articles in the past. However, in this conventional recommendation system, only articles that relate to search results are displayed, without considering the user's tastes and other attribute information, so only relating articles can be proposed, and articles that most meet the user's requirements cannot be proposed. In addition, a customer's needs cannot be understood through conversation with the customer, targeted articles cannot be specified properly.

SUMMARY

This invention has been made in view of the above technical problems, and an object of this invention is to provide a repetitive fusion search method for a search system capable of eliminating the deviation of a user's criterion for setting each feature parameter based on their instincts when searching for articles online from a database creator's criterion for setting it, by estimation based on past usage histories, so that it can extract an article closer to the user's request.

It is another object of this invention to provide a repetitive fusion search method for a search system capable of proposing, by estimating a user's potential needs based on a usage history of the user in addition to search values input by the user and by extracting user's requests from the repetition of a proposal from a system and the user's reaction to the proposal, articles that are useful to a user but unexpected by the user.

Provided according to an aspect of this invention is a repetitive fusion search method for a search system that includes: a search target database that stores information about targets to be searched for; a searcher information database that stores information about a searcher; a search interface that has the searcher input a keyword and instinct based rating information to be used for a search and displays input information and a search result; a search engine that searches the search target database and the searcher information database based on the information input via the search interface, extracts a relevant target and displays the relevant target in the search interface; and a database management unit that manages entering and updating data in the search target database and searcher information database, the method including: the search interface displaying a parameter numerical value setting field for setting a numerical value for each of multiple instinct based feature parameters, for inputting instinct based rating information, and displaying a keyword input field and a keyword selection field for inputting a keyword; and the search engine searching, using search inputs input by the searcher using the search interface, the search target database based on the input keyword, extracting relevant targets, determining priority for the relevant targets based on the input instinct based rating information, and transmitting the relevant targets as a search result to the search interface.

In the repetitive fusion search method for the search system according to the above aspect of this invention, the search engine performs the steps of: (1) performing a search by setting a highest usage frequency value for a search parameter with a highest search parameter significance level in search parameters that are not selected in the search inputs set in the search interface, extracting a relevant target, and transmitting the relevant target as a first alternative for the search result to the search interface; (2) performing a search by setting a second highest usage frequency value for a search parameter with a highest search parameter significance level in search parameters that are not selected in the search inputs set in the search interface, extracting a relevant target, and transmitting the relevant target as a second alternative for the search result; (3) defining a search input for an alternative, in the first alternative and the second alternative for the search result, selected by the searcher using the search interface as a new search input; and (4) repeating, using the new search input, searching for the first alternative to the search result in (1) and searching for the second alternative to the search result in (2) and transmitting a relevant target to the search interface, and thereby narrowing down the search targets.

In the repetitive fusion search method for the search system according to the above aspect of this invention, wherein: the search target database stores histories of past search input and target selection for each searcher; and with respect to the search input by the searcher using the search interface, the search engine estimates search tendency information of searchers such as setting criterion deviation of an instinct-based-feature-parameter and significance level of a search parameter both of which are calculated based on the histories of the past search input and target selection stored in the search target database for the relevant searcher, adjusts the search input or calculation of the matching degree between the search input and the search target using the estimation result, searches the aforementioned search target database, extracts a relevant search target, and transmits the relevant search target to the search interface.

In the repetitive fusion search method for the search system according to the above aspect of this invention, every time a certain search target is selected, the search engine estimates, based on the deviation of each search parameter set for the selected search target from each search parameter in the search input, an instinct-based-feature-parameter setting criterion deviation for each search parameter for the selected search target.

In the repetitive fusion search method for the search system according to the above aspect of this invention, every time a certain search target is selected, the search engine judges a match rate between each search parameter in the selected search target and each corresponding parameter in the search input and estimates a search parameter significance level for each search parameter by increasing, depending on the match rate, the significance level of the search parameter that matches the counterpart parameter.

In the repetitive fusion search method for the search system according to the above aspect of this invention, the search engine obtains a search input distribution for each searcher based on the search histories of each searcher stored in the searcher information database, sets a lower significance level for the search parameter with a larger search input distribution and sets a higher significance level for the search parameter with a small search input distribution, and thereby estimates the search parameter significance level of each search parameter for each searcher.

In the repetitive fusion search method for the search system according to the above aspect of this invention, the search engine obtains an input percentage for each search input for each searcher based on the search histories of each searcher stored in the searcher information database and estimates that the search input with the highest input percentage is a preferred search input for the relevant searcher.

In the repetitive fusion search method for the search system according to the above aspect of this invention, the search engine obtains a statistic for search parameters set for search targets selected in the past based on the search target and selection histories for each searcher stored in the searcher information database and estimates that the search parameter with the average value is estimated as a preference search input.

In the repetitive fusion search method for the search system according to the above aspect of this invention, the search engine stores information within one session from when a searcher starts a search until the end of the search in a short-term memory and stores information for a session in a long-term memory when the session ends.

In the repetitive fusion search method for the search system according to the above aspect of this invention, the search engine stores information within one session from when a searcher starts a search until the end of the search in a short-term memory, stores information for a session in a long-term memory when the session ends and estimates latest searcher tendency information in the long-term memory from past chronological session-unit searcher tendency information pieces.

In the repetitive fusion search method for the search system according to the above aspect of this invention, the search interface displays parameter numerical value setting fields for setting a numerical value for each of multiple instinct based features; the search engine searches, using the set numerical value for each instinct based feature parameter set in the parameter numerical value setting fields, the search target database, extracts a search target to which a criterion value close to the numerical value set for each of the input instinct based feature parameters and transmits the extracted search target to the search interface; the search engine obtains, when the search target is selected in the search interface, a setting criterion deviation of a setting criterion value for each instinct based feature parameter for the search target from the set value for each of the input instinct based feature parameters, and stores the deviation for each of the instinct based feature parameters in the searcher information database; and the search engine corrects, with respect to a newly-input numerical value setting for each instinct based feature parameter, by retrieving the setting criterion deviation for each instinct based feature parameter for the relevant searcher in the searcher information database and adding the called setting criterion deviation to the newly-input numerical value setting for each instinct based feature parameter, searches the search target database with the corrected numerical value setting for each instinct based rating parameter as a search condition, and extracts a relevant target and transmits the relevant target to the search interface.

In the repetitive fusion search method for the search system according to the above aspect of this invention, the search interface displays a setting field for setting each of multiple search parameters, the search engine calculates a matching degree for each search target by weighting, by the search parameter significance level, the deviation of the search input from each of the search parameters set for the search target, obtained for each of the search parameters, then summing the weighted deviations and displays in the search interface the search targets in descending order of the matching degree.

In the repetitive fusion search method for the search system according to the above aspect of this invention, if no search target matches a search input, which is an input search value, the search engine repeats searches by relaxing search conditions, starting from an item with the lowest search parameter significance level and extracts a relevant search target.

In the repetitive fusion search method for the search system according to the above aspect of this invention, the search engine obtains past search tendency for the relevant searcher based on the searcher's search histories in the searcher information database, extracts a search target that is highly likely selected based on the obtained past search tendency, transmits the extracted search target to the search interface, receives a searchers response transmitted from the search interface, and updates the search tendency of the relevant searcher in the searcher information database based on the content of the response.

In the repetitive fusion search method for the search system according to the above aspect of this invention, the search engine obtains an input percentage for each search input based on the search histories of each searcher, estimates the search input with the highest input percentage as a preferred search input for the relevant searcher, searches the search target database using the preferred search input, transmits the search result as a recommended target to the search interface and displays the recommended target in the search interface.

In the repetitive fusion search method for the search system according to the above aspect of this invention, the search engine learns how a searcher configures search settings during one session from when the searcher starts a search until the end of the search, enters the learned content in the searcher information database, calculates, in response to a search request from the searcher, search condition setting with the highest usage frequency in the relevant search time with reference to the searcher information database, searches the search target database based on the search condition setting, transmits the search result as a recommended target to the search interface and displays the recommended target in the search interface.

In the repetitive fusion search method for the search system according to the above aspect of this invention, the search engine holds in advance multiple situations during a search process as definition information, learns the searcher's tendency for setting search conditions in each of the multiple situations, enters the learned content in the searcher information database, judges which search situation in the definition information is relevant to the search request from the relevant searcher, extracts a preference set by the searcher with reference to the searcher information database based on the relevant search situation, searches the search target database based on the preference, transmits the search result as a recommended target to the search interface and displays the recommended target in the search interface.

In the repetitive fusion search method for the search system according to the above aspect of this invention, the search engine divides the feature of a search target into multiple feature items, displays in the search interface a parameter numerical value selling field for each feature parameter for setting a numerical value for each feature item; and reads a numerical value, for each feature parameter, set in the parameter numerical value setting field for each feature item in the search interface and transmitted by the searcher, the search engine estimates the deviation of the numerical value for each feature parameter set by the searcher from a setting criterion value for each feature parameter in the system based on the search histories of the relevant searcher in the searcher information database the search engine obtains a corrected setting numerical value for each feature parameter by correcting the deviation of the numerical value for each feature parameter set by the searcher from the setting criterion value for each feature parameter in the system, the search engine searches the search target database using the corrected search numerical value for each feature parameter, extracts a search target, transmits information for the search target as a recommended target to the search interface and displays the recommended target in the search interface.

This invention can provide a repetitive fusion search method for a search system in which, by fusing a keyword search and an instinct based search by a user in an online article search, the search being narrowed using a keyword and the search starting from a vague sense using a rating by user's instinct can be conducted simultaneously, and by repeating proposals for articles to the user based on the search results and observation of the users reaction, the user's requests can be understood accurately and recommended articles can be proposed.

This invention can also provide a repetitive fusion search method for a search system eliminating the deviation of a user's criterion for setting each feature parameter based on their instinct when searching for articles online from a database creator's criterion for setting it by estimating the deviation based on past usage histories and extracting an article that is close to the users request.

This invention can provide a repetitive fusion search method for a search system capable of estimating a user's potential needs based on the usage history of the user in addition to search values input by the user estimating the user's potential needs based on the usage history for the user, extracting user's requests from the repetition of a proposal from a system and user's reaction to the proposal and proposing articles that are useful to a user but unexpected by the user.

BRIEF DESCRIPTION OF THE DRAWINGS

FIG. 13A is a flowchart showing the first half of a proposal algorithm based on a preference set by a search in the search system in the above embodiment.

FIG. 13B is a flowchart shoring the latter half of the proposal algorithm based on a preference set by a searcher in the search system in the above embodiment.

FIG. 16 is an illustration showing a search input interface screen used in the perfume search system in the above example.

FIG. 17 is an illustration showing a search result display screen in the perfume search system in the above example.

DESCRIPTION OF EXEMPLARY EMBODIMENTS

An embodiment of this invention will be described in detail with reference to the attached drawings.

Figure 1:
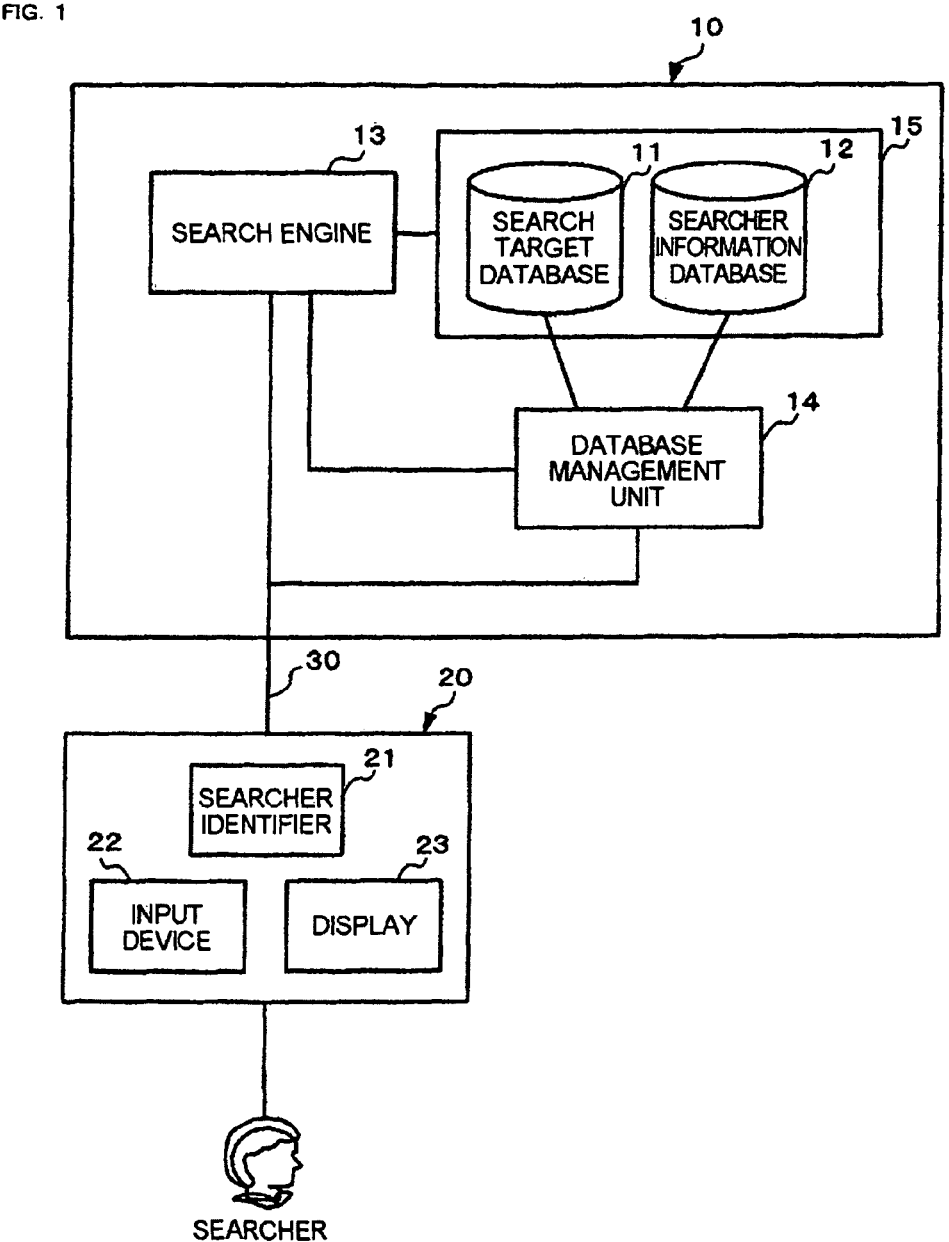
FIG. 1 is a block diagram showing a search system according to an embodiment in this invention.

FIG. 1 shows the functional configuration of a search system according to one embodiment of this invention. The search system in this invention is configured as a standalone computer system or a computer system including multiple computers connected via a network, e.g., a personal computer serving as a search terminal and an external search server connected to the personal computer via the Internet, and is realized by installing software programs for executing various functions (to be described later) and entering various kinds of data in a database in a mass storage device.

As shown in FIG. 1, the search system in this embodiment is a system that provides a search target most suitable to a searcher using a search value and searcher information. This search system includes: a search target database 11 that stores information to be searched for; a searcher information database 12 that stores information about searchers; a search interface 20 including a keyboard, pointing device, display, etc., for inputting information used for the search and displaying the input information and search results; a search engine 13 that searches the search target database 11 and the searcher information database 12 based on input via the search interface 20, extracts relevant items and displays them on the search interface 20; and a database management unit 14 for managing the databases 11 and 12.

In this embodiment, each user's personal computer serves as the search interface 20 and the databases 11 and 12 and the search engine 13 are constructed in a server system 10 in an article manufacturer or an online shopping site connected to the each user's personal computer via a network such as the Internet 30.

The databases 11 and 12 are constructed in the bulk storage apparatus 15. The search target database 11 contains and holds entered search target data having information corresponding to each search item. The search target data includes article information, and service information, etc. The searcher information database 12 holds entered searcher information. The searcher information includes a search system usage history, private information, questionnaire information, etc., for each searcher. The search system usage history held in the searcher information database 12 is chronological information for search values, search results and selection results. The usage history includes a short-term history including recent histories and a long-term history including histories from when a searcher started using the system until the present, and the long-term history is updated little by little by the short-term history. The private information for each searcher includes the ID number, name, occupation, age, sex, address, etc., of each searcher. The questionnaire information includes information relating to a searchers preferences, such as, if an article search for perfume is taken as an example, a perfume manufacturer that the searcher likes, and it depends on the subject concerned. Data entry, data merge and history management for these databases 11 and 12 are managed by the database management unit 14.

The search interface 20 includes a searcher identifier 21 for identifying and specifying a terminal used by the searcher, such as a telephone number, IP address and MAX address; an input device 22 for inputting search items; and a display 23 for displaying search results. This search interface 20 transmits search item information acquired from the searcher's identifier 21 and input device 22 to the search engine 13 in the server system 10 via the network 30 or receives information such as search results from the search engine 13 via the network 30 and displays the received information on the display 23.

The searcher identifier 21 includes a type requesting the searcher to input an identification number (ID) and a type automatically identifying the searcher. Examples of the latter type include a system in which the server system 10 automatically identifies the searcher from a cookie or IP address transmitted from the search interface 20 when the searcher tries to access the search server system 10 via the network 30. In such a case, the searcher identifier 21 is provided in the server system 10.

Figure 2:
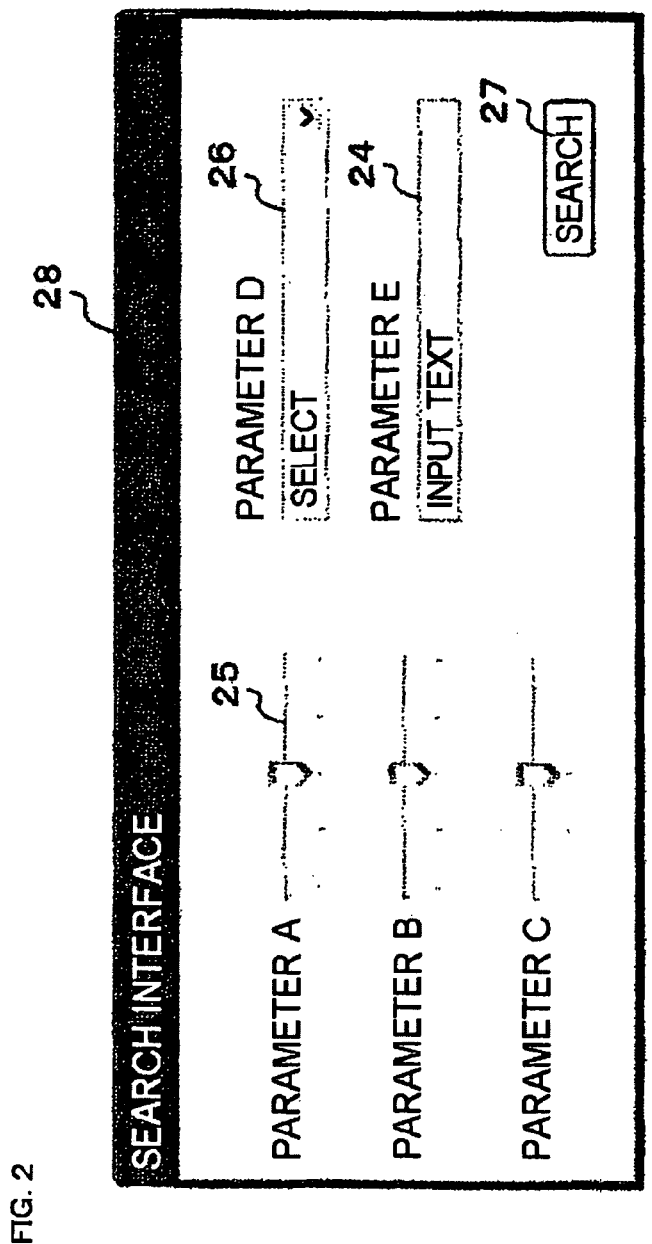
FIG. 2 is an illustration explaining a search input interface screen used in the search system in the above embodiment.

As shown in FIG. 2, search values input via the input device 22 include text, numerical values (attribute values, feature quantity, etc), selection items, etc. A search input interface screen 28 is provided with a text input field 24, a numerical value setting slider 25 for setting a parameter value for each feature parameter and an item selection field 26, and a part or all of them are used for search. For example, when performing an instinct based search, since the input value is a numerical value, the numerical value setting slider 25 for a search parameter is used in order to input numerical values. A search button 27 is also provided to transmit the search inputs.

The search engine 13 in the server system 10 extracts searcher information from the searcher information database 12 based on information transmitted from the search interface 20, searches for a relevant target in the search target database 11 using the received search values and the extracted searcher information, and transmits the search result to the search interface 20.

The search method uses a part or all of the below methods in combination. The search methods are listed below.

(i) Repetitive Fusion Search

Repetitive fusion search is a search method in which, using a fusion search of a keyword search and an instinct based search, a search is executed using search inputs partially different from the search inputs input by the searcher, a proposal is provided to the searcher, and by repeatedly narrowing down the search targets based on searchers reactions to the proposals, the searcher's needs can be ascertained, like in a conversation.

Fusion Search:

Relevant targets are extracted by a keyword search and priorities are assigned for the relevant targets by an instinct based search.

Repetitive Search:

A search is performed by changing some search inputs, and relevant targets are extracted and specified as alternatives A. Another search is performed by changing other search inputs, and relevant targets are extracted and specified as alternatives B. The search targets are narrowed down based on responses from the searcher. Alternatively, the search results using search settings with a high usage frequency, the search results using search settings in which a setting with a low search parameter significance level in the search setting configured by the searcher is changed to a value that has been set in the past, or the search results using search settings in which the most frequently-used setting is configured to a setting for an item with a high search parameter significance level in items that have not been set by the searcher are displayed as alternatives together with the search results, and the search settings for the alternatives are updated based on the searcher's reaction to the alternatives.

(ii) Search Using Searcher Tendency Information

A searcher's characteristics such as setting criterion deviation and item significance level are estimated from past search and selection histories. Search inputs are adjusted or the calculation of the matching degrees between the search inputs and search targets are adjusted using the characteristics in order to perform a search that reflects the searcher's potential requirements. The setting criterion deviations and item significance levels are obtained for each session. They are stored in the short-term memory during each session, and the long-term memory is updated when each session ends.

Estimation Method for Searcher Tendency Information

Estimation for Instinct-Based-Feature-Parameter Setting Criterion Deviation:

An instinct-based-feature-parameter setting criterion deviation is a deviation of a setting criterion for each instinct based feature parameter in the system from the searcher's subjective setting criterion for each instinct based feature parameter. Every time a certain search target is selected, each instinct-based-feature-parameter setting criterion deviation is estimated based on the deviation of instinct based feature parameters set for the selected search target from those input for search.

Search Parameter Significance Level Estimation:

The search parameter significance level is a numerical value expressing how much the searcher puts significance on each search parameter, and it is estimated by judging the match rate between the search parameters for the selected target and the search inputs, and increasing the significance level of the search parameters that match the relevant search inputs. Alternatively, search input distributions are obtained based on the search history of each searcher, and estimation is made by setting the significance level of a search parameter with a large search input distribution to low and the significance level of a search parameter with a small search input distribution to high.

Preference Search Input Estimation:

A preference search input is a search input that the searcher has liked most. The input percentage of each search input is obtained based on the search history of each searcher and the search input with the highest percentage is estimated as a preference search input of the searcher. Alternatively, a statistic for search parameters set for search targets selected in the past is obtained based on the search target selection history of each searcher, and the search parameter with the average value is estimated as a preference search input.

Update of Searcher Tendency Information

Long-Term Memory and Short-Term Memory:

Information is stored in a short-term memory during one session from when the searcher starts searching until the end of the search, and the information in each session is stored in a long-term memory when the session ends.

Search Using Searcher Tendency Information

Instinct Based Feature Parameter Setting Criterion Deviation Elimination Search:

An instinct-based-feature-parameter setting criterion deviation is automatically adjusted for each search input and then a search is performed.

Condition-Relaxed Search Using Search Parameter Significance Level:

Even if there is no target relevant to search inputs, the system automatically relaxes the search conditions, starting from the item with the lowest search parameter significance level so that the relevant targets can be always displayed.

Sorting by Weighting Matching Degree Using Search Parameter Significance Level:

By calculating the deviation of search inputs from search parameters set for search targets and weighting the deviation by the search parameter significance level, the matching degree for each target is calculated and the search targets are displayed in descending order of the matching degree.

Recommendation Based on Preference Search Input:

Based on the results of a search using preference search inputs as the search inputs, alternatives are proposed.

Setting Search Parameter Corresponding to Search Situation:

The system learns how the searcher configures search settings in one session from when the searcher starts searching until the end of the search, obtains the setting with the highest usage frequency in each search time period, and proposes recommended targets. The system defines some situations in the search process, learns a preference set by the searcher in each situation, and proposes a target that suits the situation as a recommended target.

Recommendation based on Searcher Having Similar Searcher Tendency Information:

Searchers having similar characteristics are searched for in the searcher information database 12 and targets that have been searched for or selected by those searchers are proposed.

Setting Criterion Deviation Elimination Search

Instinct based search methods include a method, called instinct based search, in which a feature parameter for each feature item for a target to be searched is expressed by a numerical value rating and a target having parameters close to the numerical values is searched. However, in conventional instinct based search methods, there is a deviation of the feature parameter setting criterion of the searcher from that of the database creator and thus the searcher sometimes cannot obtain desired results. In the search method of this embodiment, through estimating this setting criterion deviation by means of searcher's past usage history, the setting criterion deviation is eliminated, so the searcher can obtain desired search results.

Item-Significance-Level Reflection Search

When a search is performed using multiple search items, not only a target with all the items matching search values but also a similar target with its items not perfectly matching the search values is displayed. In this case, how the similarity is defined is a critical issue. Also, even when the similarity of each item is defined, if the similarities of all the search items are handled in the same way, the target the searcher desires the most may be displayed in a lower position than targets the searchers do not desire so much might occur. In the search method in this embodiment, by estimating the searcher's significance level for each item and performing weighting based on the significance levels, a target with the item of which the searcher makes much, matching with the search input value is displayed with high priority.

Recommendation Proposal Using Analysis of Searcher Tendency Information for Parameter Setting Although recommendation systems are known, the conventional recommendation systems only display targets relating to search results and do not take searcher information into account, so it can only propose targets that relate to the search results. In the search method of this embodiment, by estimating the setting with a high usage frequency by means of the past usage history and the searcher's setting significance level for each search value, user's potential needs are estimated based on the above estimation. Then, search results corresponding to this estimation of user's needs are proposed to the user. With this configuration, information that is useful but unanticipated to the user is proposed to the user. Furthermore, the searcher's tendency can be understood more accurately based on the searcher's reaction to such proposals.

Figure 3:
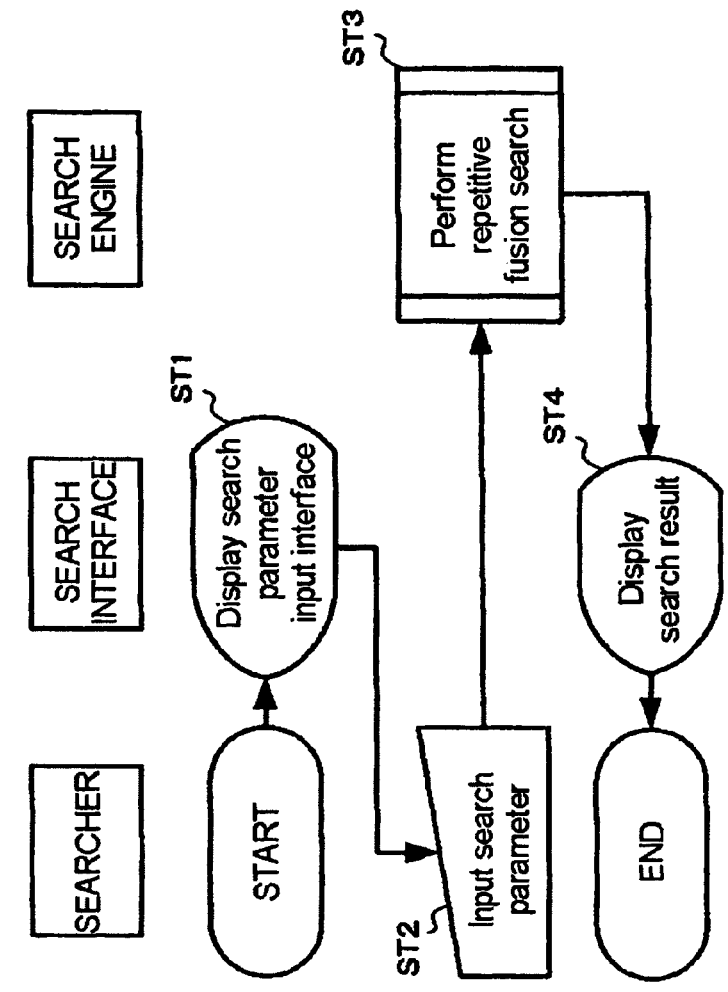
FIG. 3 is a flowchart showing a search algorithm in the search system in the above embodiment.

The repetitive fusion search will be described in detail. A search algorithm is shown in FIG. 3.

Step ST1: A searcher uses a personal computer or a PDA such as a mobile phone (search interface 20) and has the search parameter input interface displayed on it. For this processing, the search server system 10 accesses, from the search interface 20, a search site that runs on the network 30 such as the Internet, downloads and displays a search screen, and starts searching.

Step ST2: The searcher inputs a parameter value for each feature parameter in this search parameter input interface screen. The numerical value for each feature parameter is set by sliding a cursor in the numerical value setting slider 25 for the relevant feature parameter in FIG. 2 right or left.

Step ST3: The search engine 13 executes a repetitive fusion search using the input search parameters and transmits the search result to the search interface 20.

Step ST4: The search interface 20 displays the received search result.

Figure 4:
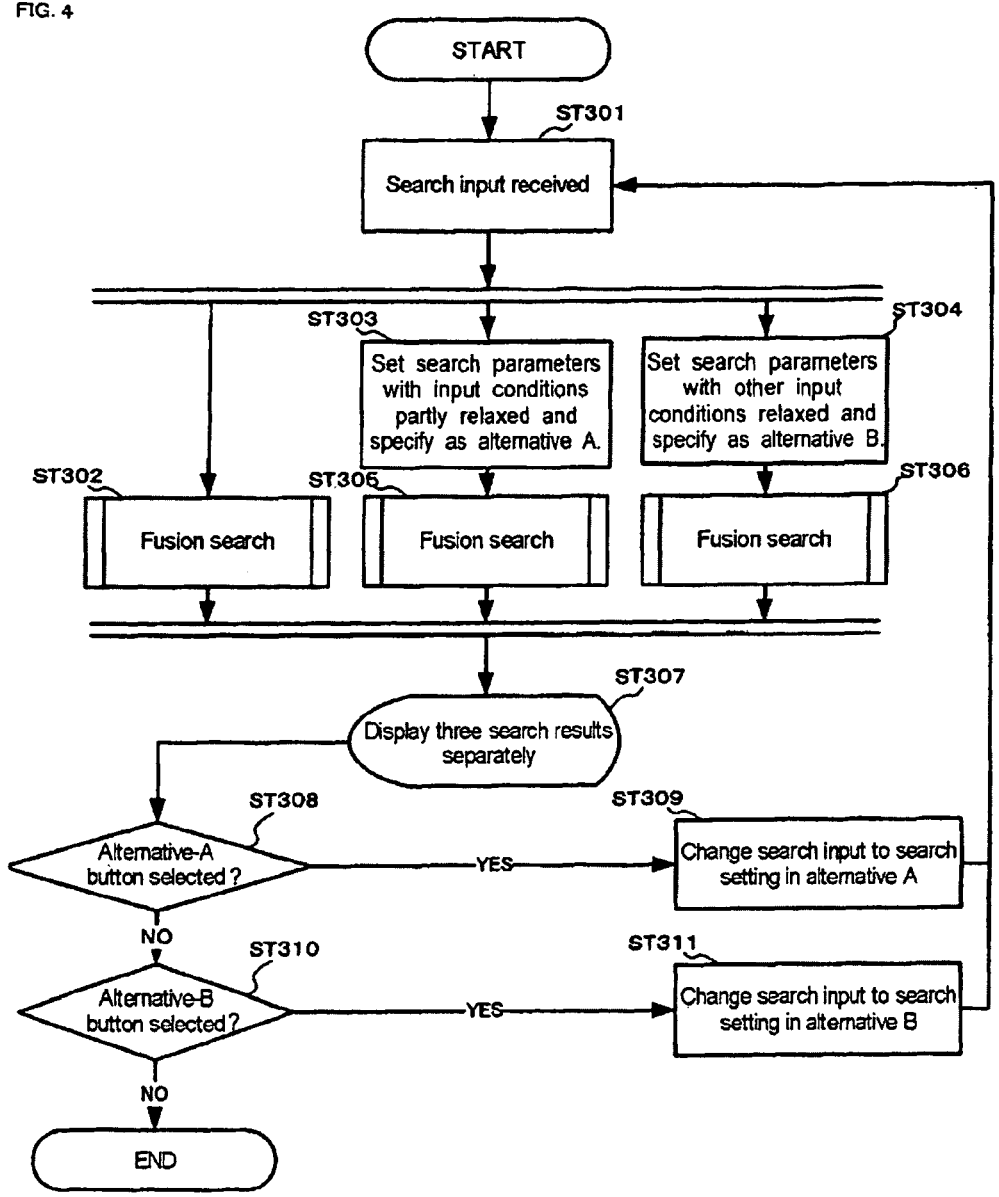
FIG. 4 is a flowchart showing a repetitive fusion search algorithm in the search system in the above embodiment.
Figure 5:
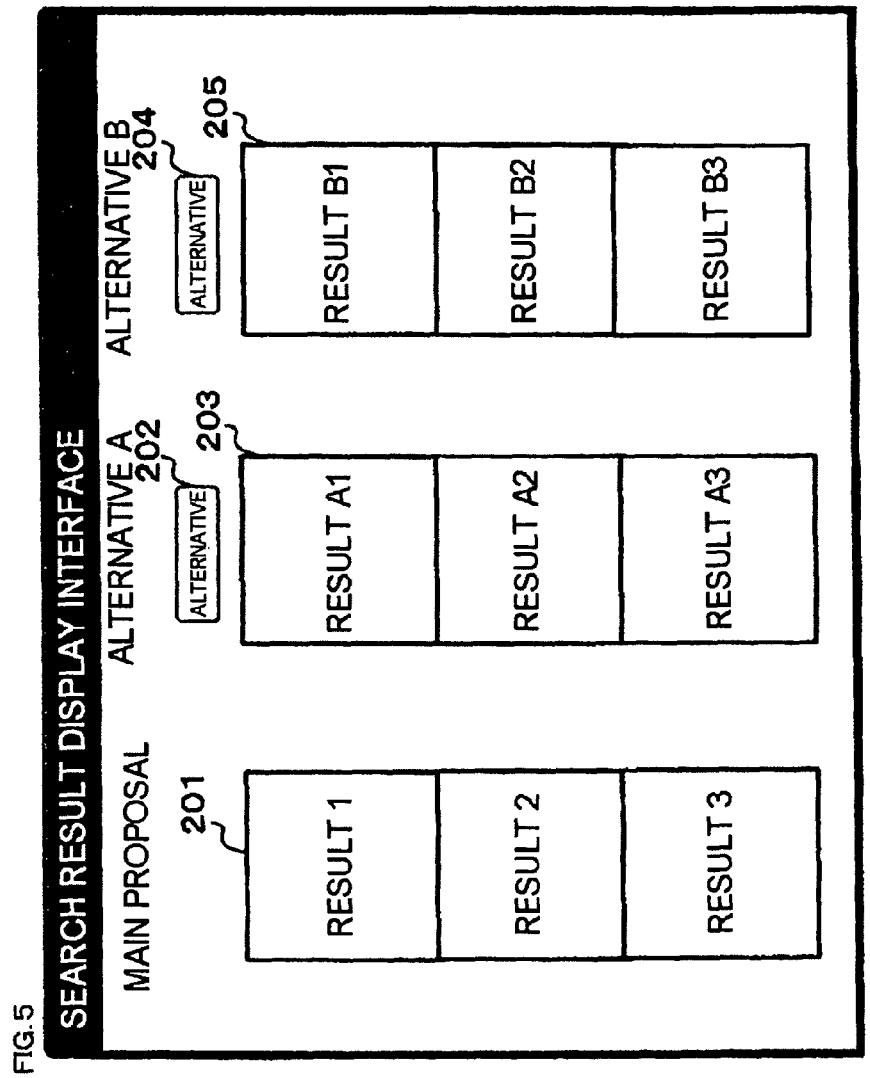
FIG. 5 is an illustration explaining a search result display interface screen used in a repetitive fusion search system in the above embodiment.

FIG. 4 shows an algorithm for the repetitive fusion search in ST3, and FIG. 5 shows a search result display interface in the repetitive fusion search.

Step ST301: The search engine 13 receives the input search parameters.

Step ST302: The fusion search is performed using the input search parameters.

Steps ST303 and ST304: Another fusion search is performed with some of the input search parameters relaxed and the search result is presented as alternative A. Alternatively, a fusion search is performed by setting the highest usage frequency value for an item having a high significance level in unselected search parameters and its search result is presented as alternative A.

Steps ST305 and ST306: A fusion search is performed by relaxing some conditions in the parameters (different from those relaxed in step ST7) and its search result is presented as alternative B. Alternatively, a fusion search is performed by setting the second highest usage frequency value for an item having a high significance level in unselected search parameters and its search result is presented as alternative B.

Step ST307: The search interface 20 displays the search result from step ST302 as a main proposal in a search result display field 201, displays the search result from step ST305 as alternative A in a search result display field 203, and displays the search result from step ST306 as alternative B in a search result display field 205. Note that the reference numeral 202 denotes an alternative A button and the reference numeral 204 denotes an alternative B button.

Steps ST308 and 309: If the alternative A button 202 from ST305 is selected, the search inputs are changed to the setting of the search parameters for alternative A. Then the processing returns to step ST301 and the search is repeated.

Steps ST310 and ST311: If the alternative B button 204 from step ST306 is selected, the search inputs are changed to the setting of the search parameters for alternative B. Then the processing returns to step ST301 and the search is repeated. If not, the repetitive fusion search is terminated.

Figure 6:
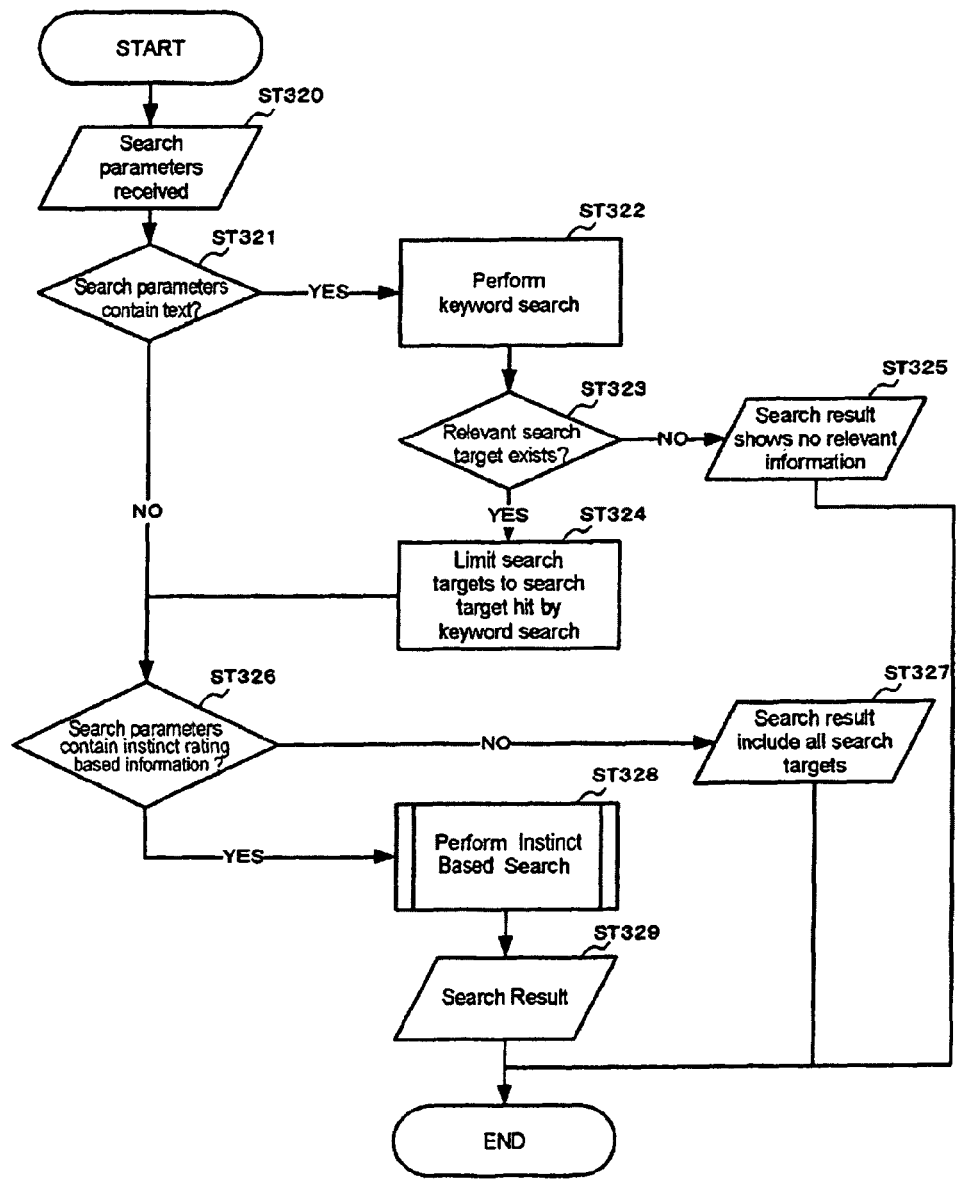
FIG. 6 is a flowchart showing the fusion search algorithm in the search system in the above embodiment.

The algorithms for the fusion search in steps ST302, ST305 and ST306 are shown in FIG. 6.

Step ST320: The search parameters are received.

Steps ST321 and ST322: If search parameters using the text input field 24 and the item selection field 26 are set as the search parameters, a search is performed using a keyword (text).

Steps ST323, ST324 and ST325: If there are relevant search targets, the search targets are limited to those relevant to the keyword search. If there is no relevant search target, the search is terminated with no relevant search target found.

Steps ST326 to ST329: If search parameters using the numerical value setting slider 25 for setting instinct based rating information (feature parameters) are set as the search parameters, an instinct based search is performed, the search result is fed back, and the search is terminated. If the search parameters using the numerical value setting slider 25 are not set as the search parameters, all the search targets are provided as the search result and the search is terminated.

Figure 7:
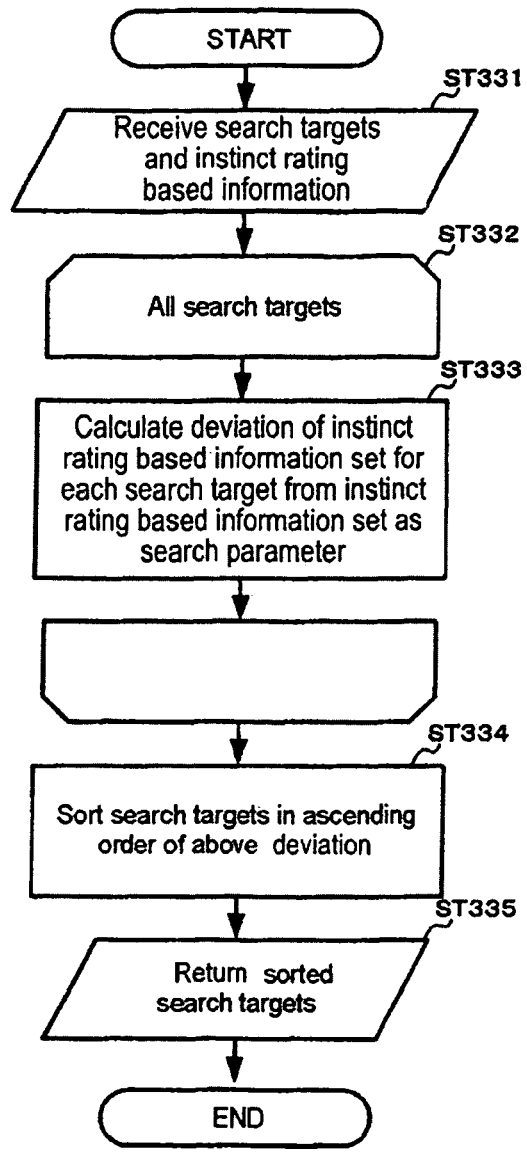
FIG. 7 is a flowchart showing an instinct based search algorithm in the search system in the above embodiment.

FIG. 7 shows an algorithm for the instinct based search in step ST328.

Step ST331: Search targets and instinct based rating information (i.e., feature parameters set by the numerical rating value setting slider 25) are received.

Step ST332: For all the search targets, (the total on the deviation of a numerical value parameter expressing instinct based rating information set for each search target from a numerical value parameter expressing instinct based rating information set as the search parameter are calculated.

Steps ST333 to ST335: The search targets are sorted sequentially from the search target with the smallest deviation and the result is fed back.

Figure 8:
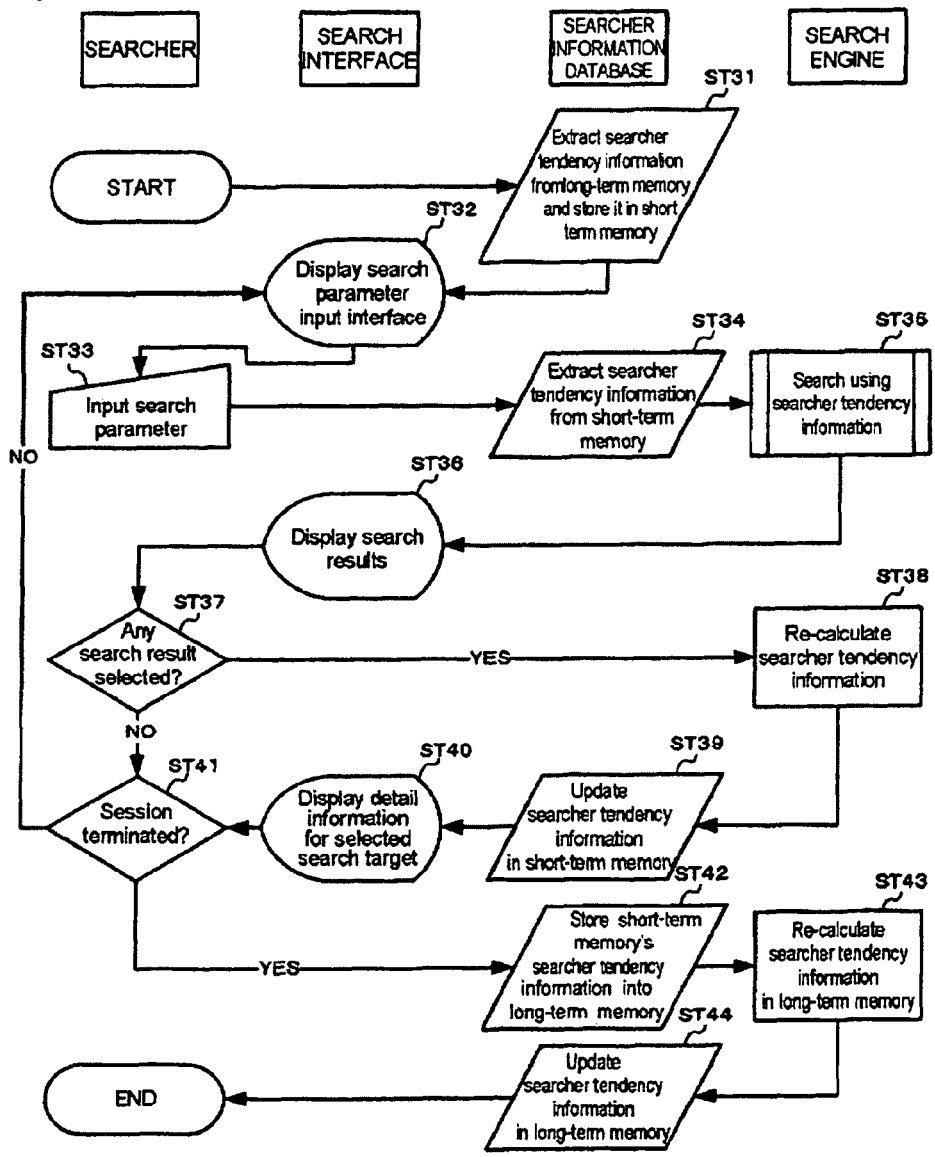
FIG. 8 is a flowchart showing an algorithm for estimating searcher tendency information based on search/selection history information and updating information using a long-term memory and short-term memory in the search system in the above embodiment.

FIG. 8 shows an algorithm for estimating searcher tendency information based on search and selection histories and updating information in the long-term memory and short-term memory. In this algorithm, the history for one session is stored in the short-term memory, a searcher tendency information estimation value is estimated for each session and stored in the long-term memory. From the past chronological searcher tendency information estimation values stored in the long-term memory, the current searcher tendency information estimation value is estimated.

Step ST31: The searcher tendency information estimation value is extracted from the long-term memory and stored in the short-term memory.

Step ST32: The search parameter input interface is displayed.

Step ST33: The searcher inputs search parameters in the interface and transmits the parameters.

Step ST34: The database management unit 14 extracts the searcher tendency information estimation value from the short-term memory in the searcher information database 12 based on the search parameters.

Step ST35: The search engine 13 performs a search using the input search parameters and searcher tendency information and transmits the results to the search interface 20.

Steps ST36 and ST37: The search interface 20 displays the received search results. The searcher selects one of the search results and transmits the selected one to the search engine 13. If the searcher does not select any search result, the processing proceeds to step ST41 where whether the session is terminated or not is judged.

Steps ST38 and ST39: The search engine 13 calculates the deviation of the parameter values of the selected target from the parameter values input by the searcher. Then the search engine 13 calculates a new searcher tendency information estimation value and provides it to the database management unit 14. Based on this value, the database management unit 14 updates the searcher tendency information estimation value in the short-term memory in the searcher information database 12 and also transmits detailed information for the selected search target to the search interface 20.

Step ST40: The search interface 20 displays the received detailed information for the selected search target. At this time, the search interface 20 may display a question as to whether the update of the searcher tendency information estimation value is acceptable or not and perform an update if it is acceptable, or alternatively may perform update without asking the above question.

Step ST41: The searcher checks the display of the search interface 20 and judges whether to terminate the session or to input parameters again. If the searcher selects inputting parameters again, the processing proceeds to step ST32. If the parameters are re-set, a new searcher tendency information estimation value can be obtained from the deviation of the re-set parameter setting from the parameter setting used for the previous search. For example, if the parameter is moved, relative to the previous search, in the direction toward the setting criterion deviation estimation value when a search is performed again, the setting criterion deviation estimation value is increased in the same direction. On the other hand, if the parameter is moved, relative to the previous search, in the direction opposite to the setting criterion estimation value, the setting criterion estimation value is decreased in the same direction. Meanwhile, if it is determined that the session is terminated, the search interface 20 transmits a session end report to the database management unit 14.

Steps ST42 to ST44: When receiving the session end report, the database management unit 14 stores, in the long-term memory, the searcher tendency information estimation value in the short-term memory in the searcher information database 12. The search engine 13 calculates a searcher tendency information estimation value in the new long-term memory. Then the search engine 13 provides the calculation result to the database management unit 14, and the database management unit 14 updates the searcher tendency information estimation value in the long-term memory in the searcher information database 12 and completes the processing. At this time, a question as to whether to reflect the searcher tendency information estimation value obtained this session in the long-term memory before the processing is terminated or not may be displayed and the update may be performed only when it is accepted, or alternatively, the update may be performed automatically without asking the question.

The searcher tendency information estimation value includes an instinct based feature parameter setting criterion deviation estimation value, a search parameter significance level estimation value, a preference search input estimation value, etc.

The setting criterion deviation estimation value is obtained using the below equation in step ST38.

Setting criterion deviation estimation value=old criterion deviation estimation value+α*(observed criterion deviation−old criterion deviation estimation value)

In the equation, the observed criterion deviation=feature parameter value for the target selected by the searcher−feature parameter value input by the searcher. The "α" represents rate of learning and is a real value between 0 and 1 inclusive.

In order to improve the estimation accuracy, a setting criterion estimation function for obtaining a setting criterion deviation estimation value corresponding to the set value for each feature parameter can be obtained instead of setting one setting criterion deviation estimation value for each feature parameter. For example, the setting range of each feature parameter is divided into some parts and a setting criterion deviation estimation value is obtained for each range. This setting criterion deviation estimation function for the feature parameter is expressed as an approximate function by linearly combining the setting criterion deviation estimation values for these parts.

Figure 9:
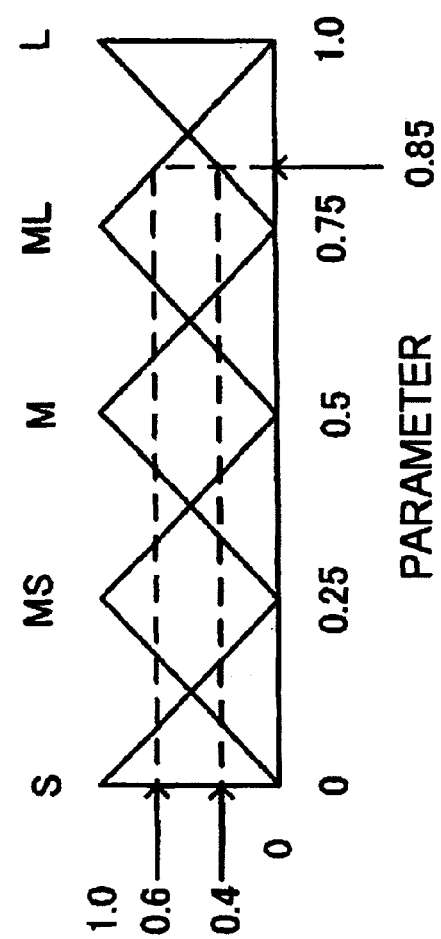
FIG. 9 is an illustration explaining how a parameter range is divided into parts using a basis function in the search system in the above embodiment.

An example in which the setting criterion deviation estimation function is obtained by fuzzy modeling will be described below. As shown in FIG. 9, a parameter is divided by five basis functions of S. MS, M, ML and L. If the searcher sets the parameter to 0.85 but the parameter for the selected target is 0.9, the matching degree of the basis function L is 0.4, the matching degree of the basis function ML is 0.6 and the matching degree of other basis functions is 0.

(1) Observed criterion deviation=feature parameter value for the target selected by the searcher−feature parameter value input by the searcher=0.9−0.85=0.05

(2) Criterion deviation estimation value of basis function L=old criterion deviation estimation value of basis function L+value of basis function L (=0.4)*α*(observed criterion deviation (=0.05)−old criterion deviation estimation value of basis function L)

(3) Criterion deviation estimation value of basis function ML=old criterion deviation estimation value of basis function ML+value of basis function ML (=0.6)*α*(observed criterion deviation (=0.05)−old criterion deviation estimation value of basis function ML)

(4) Since the matching degree of basis functions S, MS and M is zero, so they are not updated.

The criterion deviation estimation value for each basis function is updated as described above.

The estimation for the criterion deviation estimation value of the long-term memory is obtained in step ST43 using a chronological prediction method by expressing the stored past criterion deviation estimation values in time series using an autoregressive moving-average model.

An example of the item-significance-level calculation is a method in which, in step ST38, targets that have been selected are recorded, a lower significance level is set for an item with a larger search value distribution and a higher significance level is set for an item with a smaller search value distribution. Another calculation example is a method in which, in step ST38, every time a target is selected, the significance level of an item whose search value matches with the parameter set for the selected target is increased.

The estimation for the criterion deviation estimation value of the long-term memory is obtained in step ST43 using a chronological prediction method by expressing the stored past criterion deviation estimation values in time series using an autoregressive moving-average model.

Figure 10:
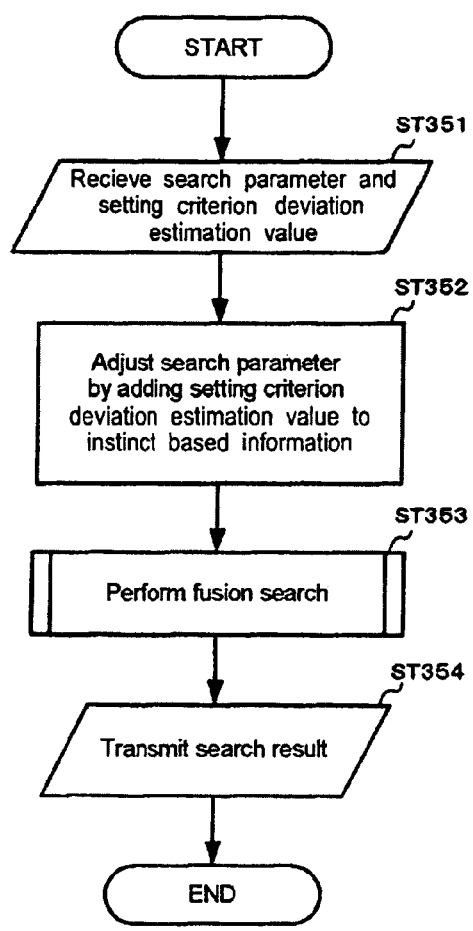
FIG. 10 is a flowchart showing a criterion deviation elimination search algorithm, which is one of the searches using searcher tendency information, in the searcher system in the above embodiment.

FIG. 10 shows an algorithm for a setting criterion deviation elimination search, which is a search method using the searcher tendency information in step ST35.

Step ST351: A search parameter and a setting criterion deviation elimination value are received.

Step ST352: The input search parameter is automatically adjusted. The automatic adjustment of the feature parameter is performed using the below equation.

Adjusted feature parameter value=feature parameter value+setting criterion deviation estimation value Steps ST353 and ST354: The fusion search is performed using the adjusted search parameter and the search result is transmitted.

Figure 11:
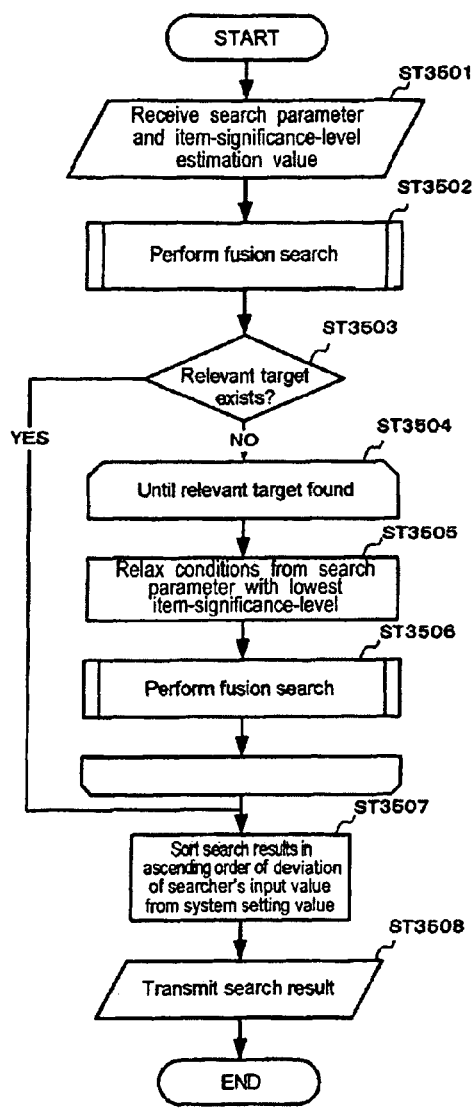
FIG. 11 is a flowchart showing an item-significance-level reflection search algorithm for relaxing conditions, which is one of the searches using the searcher tendency information, in the search system in the above embodiment.

Next, an example of an item-significance-level reflection search, which is a search method using the searcher tendency information in step ST35, will be described with reference to FIGS. 11 and 12. The algorithm shown in FIG. 11 is an item-significance-level reflection search method by relaxing conditions, and even if there is no target that matches an input search value, the system automatically relaxes search conditions for the items with a low significance level so that the relevant target can always be displayed.

Step ST3501: A search parameter and a significance level estimation value are received.

Steps ST3502 to ST3506: A fusion search is performed, and if no relevant target can be found, the search is repeated by sequentially relaxing the search conditions, starting from the parameter with the lowest item significance level until the relevant target is found.

Steps ST3507 and ST3508: In either case: where the relevant target is found in the first search or the relevant target is found by relaxing the search conditions, search results are sorted the ascending order of the deviation of the searcher's input value from the system setting value, and the search results are transmitted.

Figure 12:
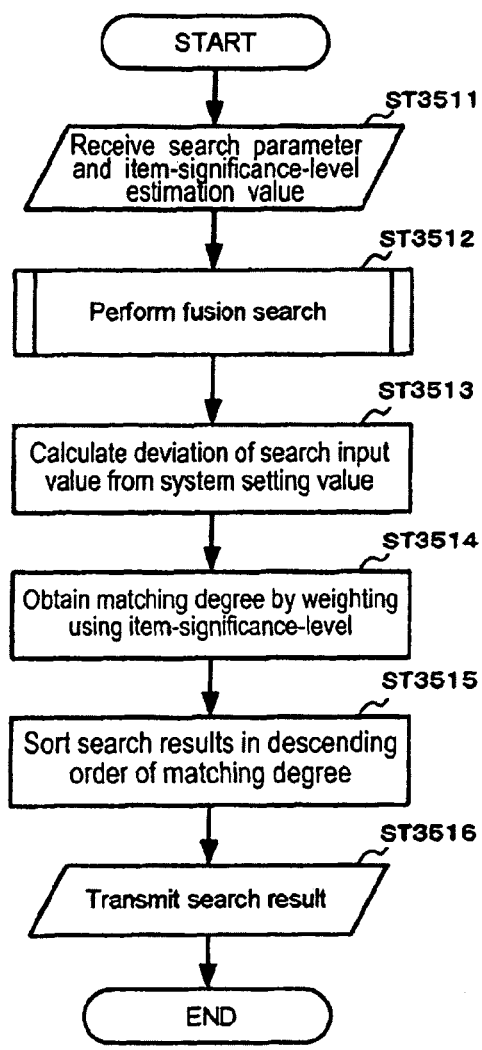
FIG. 12 is a flowchart showing an item-significance-level search algorithm for sorting based on matching degree obtained by calculation weighted using item significance levels, which is one of the searches using the searcher tendency information, in the search system in the above embodiment.

The algorithm shown in FIG. 12 is an item-significance-level reflection search method based on matching degree judgment. In this method, by calculating the deviation of a search value and a setting value for a target from weighting it using an item significance level, the matching degree of each target is calculated and the targets are displayed in descending order of the matching degree.

Steps ST3511 and ST3512: A search parameter and an item-significance-level estimation value are received and relevant targets are searched for by the fusion search.

Steps ST3513 to ST3516: The deviation of a search value from a setting value for each target is calculated, the matching degree is obtained by weighting using the item significance level, and the targets are sorted in descending order of the obtained matching degree. The search results are then transmitted.

The matching degree of the target is obtained as shown below.

Matching degree of target=deviation of search value fot search item 1 from setting value for target*significance level of search item 1+deviation of search value fot search item 2 from setting value for target*significance level of search item 2+ . . . deviation of search value fot search item n from setting value for target*significance level of search item n.

In the above equation, the symbol "n" represents the number of search items.

The significance level of a search item is expressed as follows.

$\Sigma$ significance level of search item=1.0

0≤significance level of each search item≤1.0

The deviation of a search value for each search item from a setting value for a target is 1.0 when they totally match each other and 0.0 when they do not match each other, and the intermediate value is normalized so as to be between 0 and 1.

Next, the processing in which the server system 10 analyzes a preference set by a searcher and proposals and recommendations are provided to the searcher based on the analysis result.

A target which the searcher has not expected but is presumed as being a potential target based on the searcher's past tendency is proposed, and the item significance level is estimated more accurately based on the searcher's reaction to the proposal. If the target proposed by the system is selected by the searcher, the item significance level is updated like in the item-significance-level reflection search. The proposal includes proposal by changing some of the search values input by the searcher and proposal based on the searcher's preference. At the same time, the searcher's preference may be set based on the searcher's answer to a questionnaire and search results may be recommended or proposed based on the set preference.

Proposal by Partially Changing Search Values Input by Searcher

In this method, using search values input by the searcher, a search is performed by changing some of the currently-estimated item significance levels and the search result is proposed. If the proposed target is selected, that means the changed part of the item significance level is probably low, so processing for lowering the item significance level of the relevant item or similar is performed. If the proposed target is not selected, no processing is performed.

Proposal Based on Preference Set by Searcher

The setting with the highest usage frequency for each search item is calculated based on the searcher's past search history, and the result is proposed as a recommended target. FIGS. 13A and 13B show its algorithm.

Steps ST61 to ST62: If the searcher is using the system for the first time, the search interface 20 displays a questionnaire input interface screen, and the searcher answers the questionnaire on the screen and transmits the answer to the server system 10. If it is not the searcher's first time, the searcher directly proceeds to step ST63.

Steps ST63 and ST64: The search interface 20 displays the search parameter input interface, and the searcher inputs search parameters in this screen and transmits them to the server system 10.

Step ST65: The database management unit 14 extracts the past search history from the searcher information database 12 and stores a new history.

Steps ST66 to ST69: The search engine 13 searches the search target database 11 using the input search parameters, searches it in the same way using the settings used most frequently in the extracted search history in step ST65 and searches it using the questionnaire result. The search results are sorted in ascending order of the deviation of the searcher's input value from the system setting value and transmitted to the search interface 20.

Steps ST70 to ST73: The search interface 20 displays the received search results. The search results using the input search parameters, the search results using the setting used most frequently and the search results based on the questionnaire result may be displayed in various ways—displayed in different rows at the same time, displayed in a common row, displayed in different frames, displayed in different windows, etc.

If the searcher checking the displayed search results selects one of the search results, the search interface 20 transmits the selection result to the server system 10. If the searcher checking the search results judges that a repeat search is required, the searcher returns to step ST64.

Steps ST74 to ST77: When receiving the selected search result, the database management unit 14 records in the searcher information database 12 the selected target by associating it with the search parameter. The search engine 13 updates the significance level of the parameter and the setting used most frequently. The database management unit 14 updates the most frequently used setting in the searcher information database 12. Also, the search engine 13 transmits detailed information about the selected search target to the search interface 20 and displays the detailed information. Note that proposals that have not been expected by the searcher can be made by setting some search items at random.

Steps ST73, ST78 and ST79: If the searcher continues the search, the searcher returns to the search interface. If the searcher terminates the session, the searcher terminates it immediately or after answering a questionnaire.

As described above, by performing a search using this algorithm, the system learns how the searcher configures search settings during one session from when the searcher starts the search to the end of the search, calculates the setting with the highest usage frequency for each search time period, and can display recommended targets. The system may also define some situations in the search process, learn a preference set by the searcher in each situation and display recommended targets suitable for each situation.

Next, a perfume search site will be described as an example of the search system in this invention. The configuration of the search system in this example is as shown in FIG. 1: the server system 10 is provided in a cosmetics search site, and a user (searcher) accesses the server system 10 using a client machine such as a personal computer as the search interface 20 via the internet 30.

Figure 14:
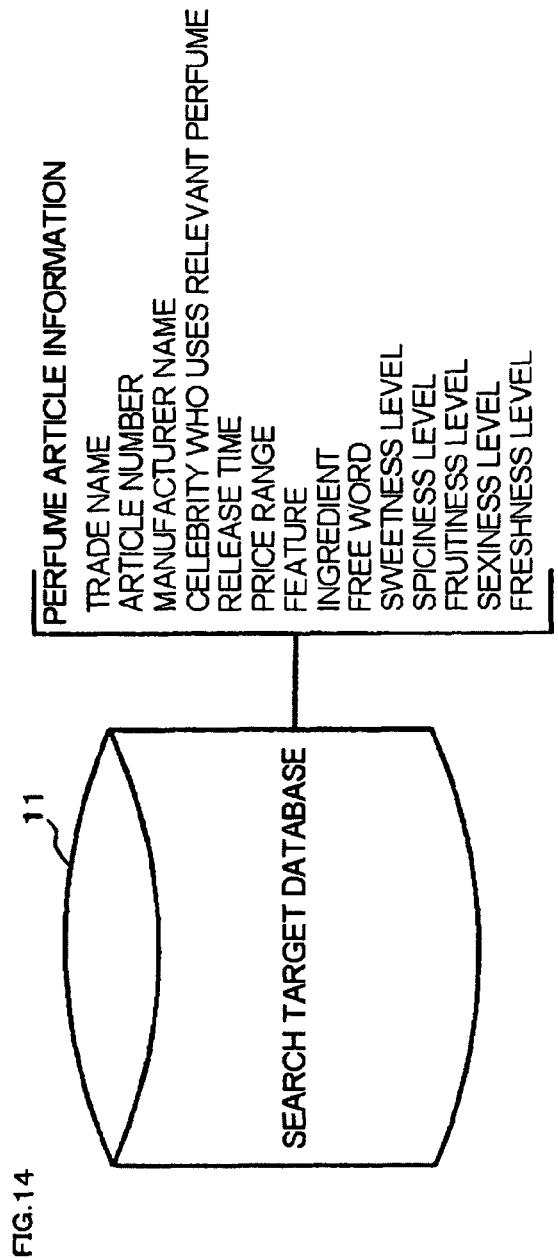
FIG. 14 is an illustration explaining the content of data entered in a search target database in a perfume search system according to an example in this invention.

As shown in FIG. 14, the search target database 11 in the server system 10 contains, for each of many perfumes, article information such as trade name, article number, manufacturer name, celebrities who use the perfume, release time, price range, and free words and feature parameters for instinct based search such as sweetness level, spiciness level, fruitiness level, sexiness level and freshness level.

Figure 15:
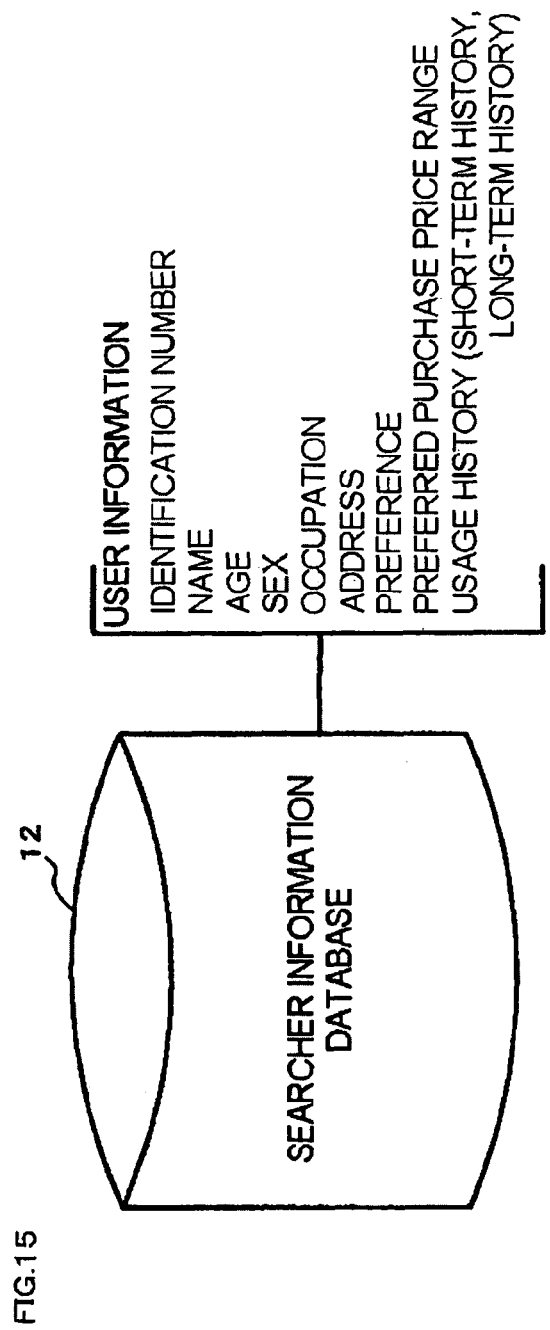
FIG. 15 is an illustration explaining the content of data entered in a searcher information database in the perfume search system in the above example.

As shown in FIG. 15, the searcher information database 12 contains user information, collected online or by post, such as a name, sex, age, an address, preference and an occupation. Also, the searcher information database 12 contains a short-term usage history and a long-term usage history for the search system for each user. Also, it contains search parameters transmitted from each user.

A search screen 28 as shown in FIG. 16 is displayed in the search interface 20. The search screen 28 includes the test input field 24, the sliders 25 for inputting parameters (attribute value, feature quantity, etc.) with numerical values and the selection fields 26 for having the user select the manufacturer name, the celebrity who uses the perfume, the release time, etc., and all or some of them are used for searches. For example, in an instinct based search, input values are numerical values, so the numerical value setting slider 25 for setting a numerical value for each feature parameter is used. The selection fields 26 are used for inputting the manufacture name, the celebrity who uses the perfume, the release time, the price range, etc. Free words are input in the text input field 24. The free words are not limited to the trade name and manufacturer name, and the user inputs terms and sentences that the user can think of, e.g., a description of the article.

The manufacturer name, the celebrity who uses the perfume, the release time, the price range, free words and parameters for the instinct based search such as sweetness level, spiciness level, fruitiness level, sexiness level, freshness level are set as search items for search in searcher information database.

The manufacturer name, celebrity who uses the perfume, release time, price range, etc., are configured to be selectable. Search values for the manufacture names and celebrities who use the perfume are categorized into groups, such as "XX type." The free words can be searched for freely from article descriptions, etc., and are not limited to the trade name, manufacturer name, etc. The parameters for the instinct based search are input by numerical values using the sliders, and a feature parameter that is not used for the search can be unchecked.

Next, perfume search processing using the above perfume search system will be described below. When a user accesses the server system 10 the search interface 20 via the internet 30 and completes login, the search screen 28 in FIG. 16 is displayed in the display 23 in the search interface 20.

Figure 18A:
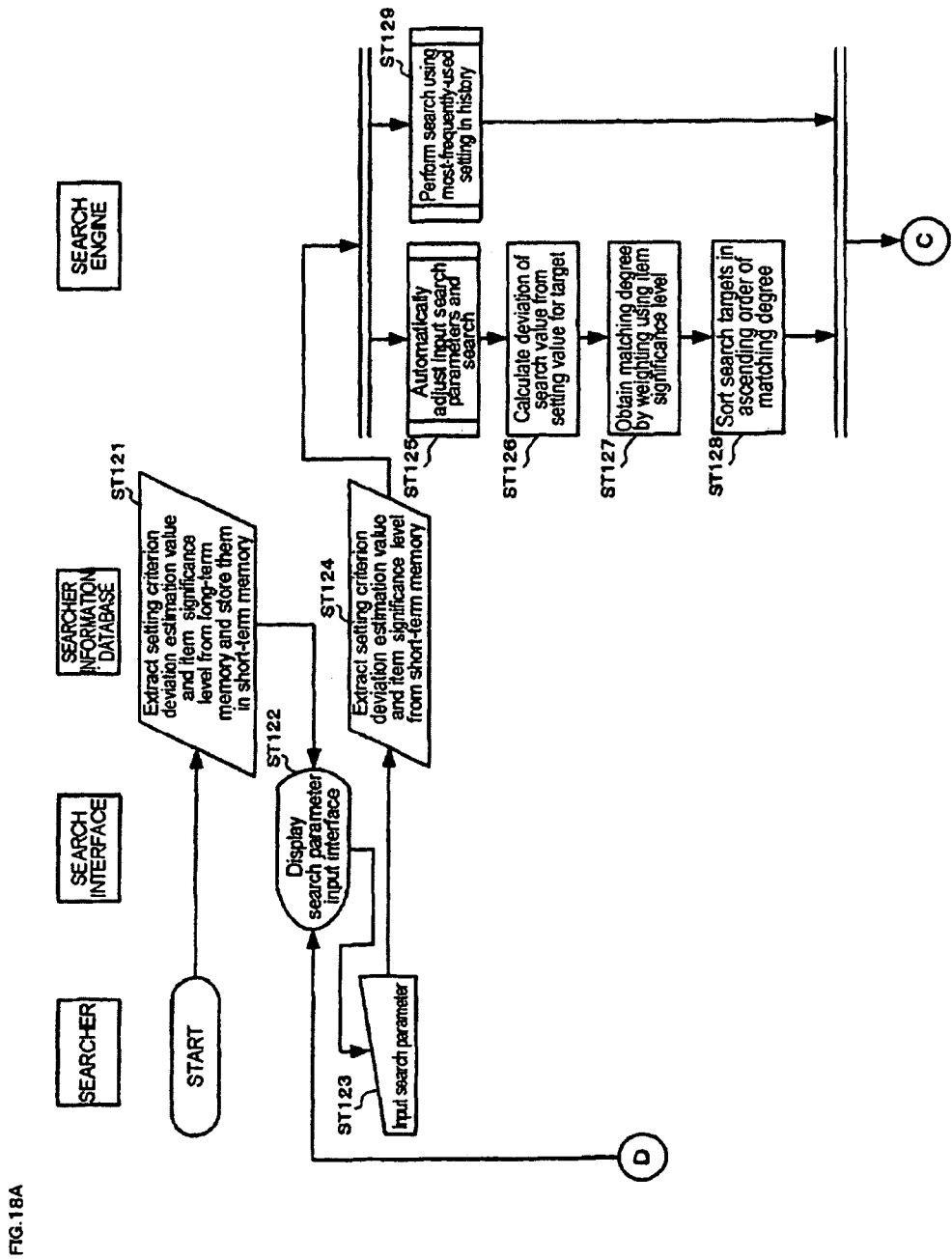
FIG. 18A is the first half of a flowchart showing a perfume search algorithm in the perfume search system in the above example.
Figure 18B:
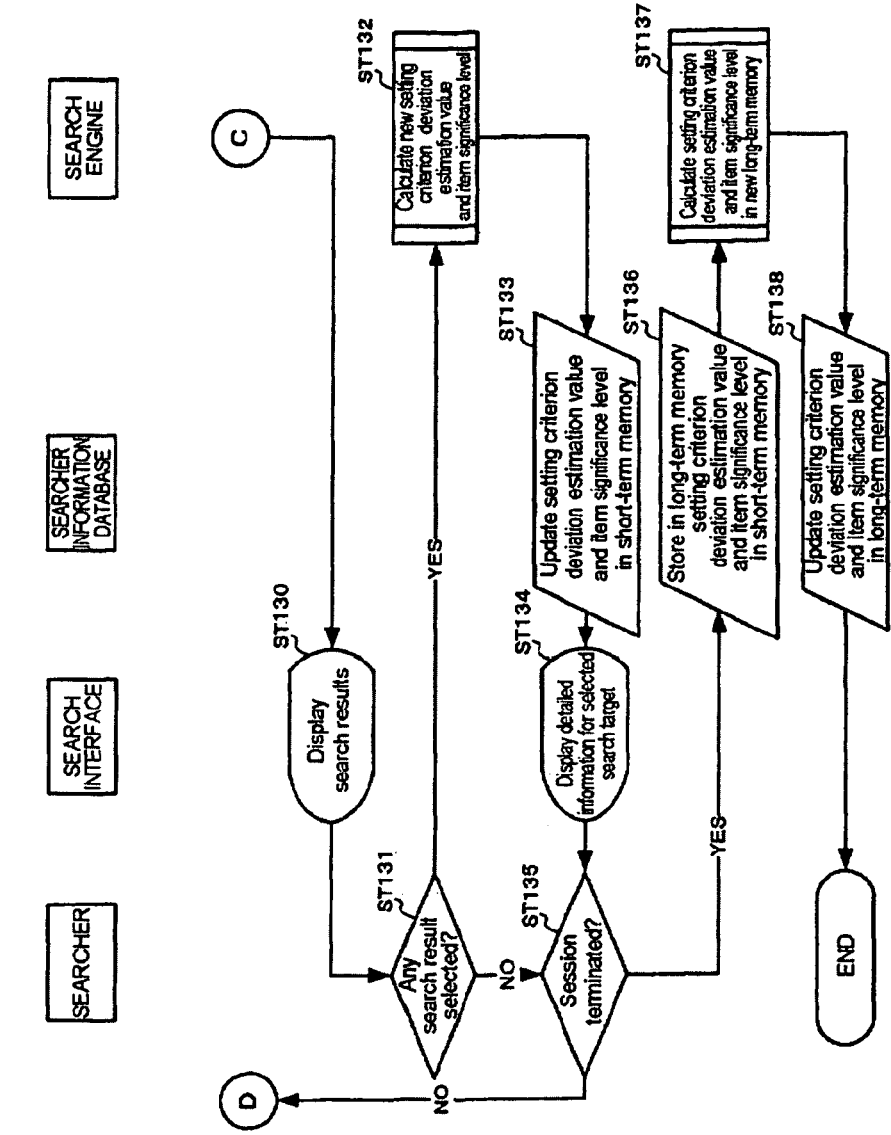
FIG. 18B is the latter half of the flowchart showing the perfume search algorithm in the perfume search system in the above example.

Then when the user inputs each item and clicks the search button 27, the search engine 14 in the search server system 10 automatically adjusts the search parameters input by the user as shown in FIG. 17, displays the automatically-adjusted results using bars 25B in a color different from the color of slide cursors 25A so that the user can compare them to the parameters the user has set, and displays search results in a search target display field 29 in descending order of closeness to the search conditions for the feature parameters. At the same time, an article proposed by the system is displayed on the right side. The above perfume search processing will be described using the flowcharts in FIGS. 18A and 18B.

Steps ST121 to ST123: When a user accesses a perfume search site, the database management unit 14 in the server system 10 performs preprocessing for extracting setting criterion deviation estimation values and item significance levels from the long-term memory and storing them in the short-term memory in the searcher information database 12 and displays the search input interface screen 28 in the search parameter input interface 20. When the user inputs various parameters in the search input interface screen 28, the search parameters are transmitted to the server system 10 via the search interface 20.

Steps ST124 to ST128: The search engine 13 in the server system 10 receives the search parameters and extracts the setting criterion deviation estimation values and item significance levels from the short-term memory in the searcher information database 12. The search engine 13 then automatically adjusts the input search parameters and executes a search. The search engine 13 calculates the deviation of the search value from the setting value of each target, obtains matching degree by weighting using the item significance levels, and sorts the targets in descending order of the matching degree.

Steps ST129: Also, when receiving the search parameters, the search engine 13 in the server system 10 performs a search using the setting with the highest usage frequency from the user history in the searcher information database 12.

Step ST130: The search engine 13 transmits the search results to the search interface 20 and displays them in the search interface 20. This display is as shown in FIG. 11.

Step ST131: When the user selects one of the perfumes extracted as the search results, this selection information is transmitted to the search engine 13 in the server system 10 via the search interface 20. If no perfume is selected, the processing proceeds to step ST135.

Steps ST132 to ST134: The search engine 13 calculates a new setting criterion deviation estimation value and item significance level and transmits them to the database management unit 14. The database management unit 14 updates the setting criterion deviation estimation values and item significance levels in the short-term memory for the relevant searcher information in the searcher information database 12 based on the calculation result. The search engine 13 transmits detailed information for the selected search target to the search interface 20 and displays it in the search interface 20.

Step ST135: If the user checking the displayed search results decides to terminate the session, the user performs termination operation. Meanwhile, if the user determines to continue the search, the user performs the 're-search' operation and returns to step ST122.

Steps ST136 to ST138: If the user commands termination of the session, that command is transmitted from the search interface 20 to the server system 10, and the database management unit 14 stores, in the long-term memory, the setting criterion deviation estimation values and item significance levels in the short-term memory for the relevant searcher information in the searcher information database 12. The search engine 13 calculates a new setting criterion deviation estimation value and significance level in the long-term memory and transmits them to the database management unit 14, and the database management unit 14 updates data in the relevant item in the searcher information database 12.

Perfume search processing using a repetitive fusion search in the above perfume search system will be described below. When a user accesses the perfume search server system 10 using the search interface 20 via the Internet 30 and completes login, the search screen 28 in FIG. 16 is displayed in the display 23 in the search interface 20.

Figure 19:
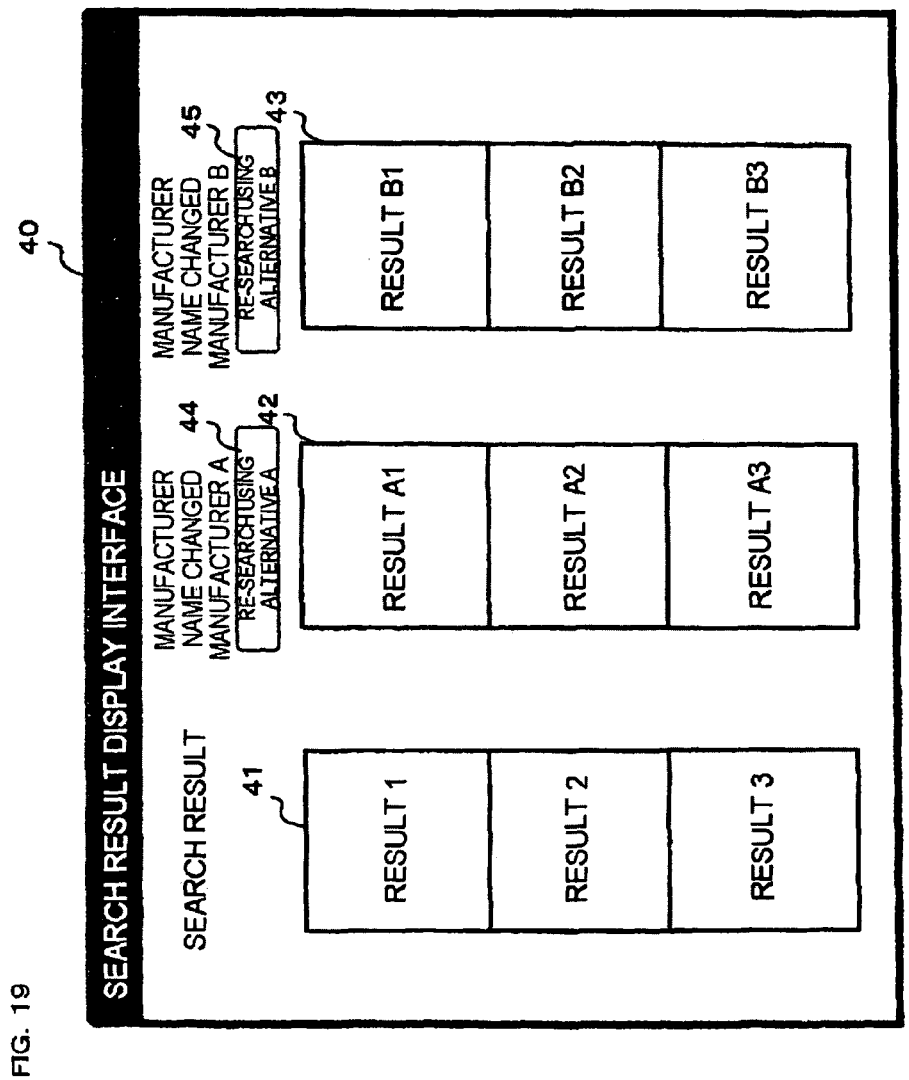
FIG. 19 is an illustration showing a search input interface screen for the perfume search using repetitive fusion in the perfume search system in the above example in this invention.

When the user inputs each item and clicks the search button 27, the search engine 13 in the search server system 10 prepares two alternative settings by automatically changing the search parameters input by the user, as shown in FIG. 19. The search engine 13 displays the search results using the search parameters input by the user in descending order of closeness to the feature parameters in a search target display field 41, displays the search results using one alternative setting in descending order of closeness to the feature parameters in a search target display field 42, and displays the search results using the other alternative setting in descending order of closeness to the feature parameters in a search target display field 43. Also, a changed condition in the feature parameters is also displayed above each of the search result fields for the alternative setting.

Figure 20A:
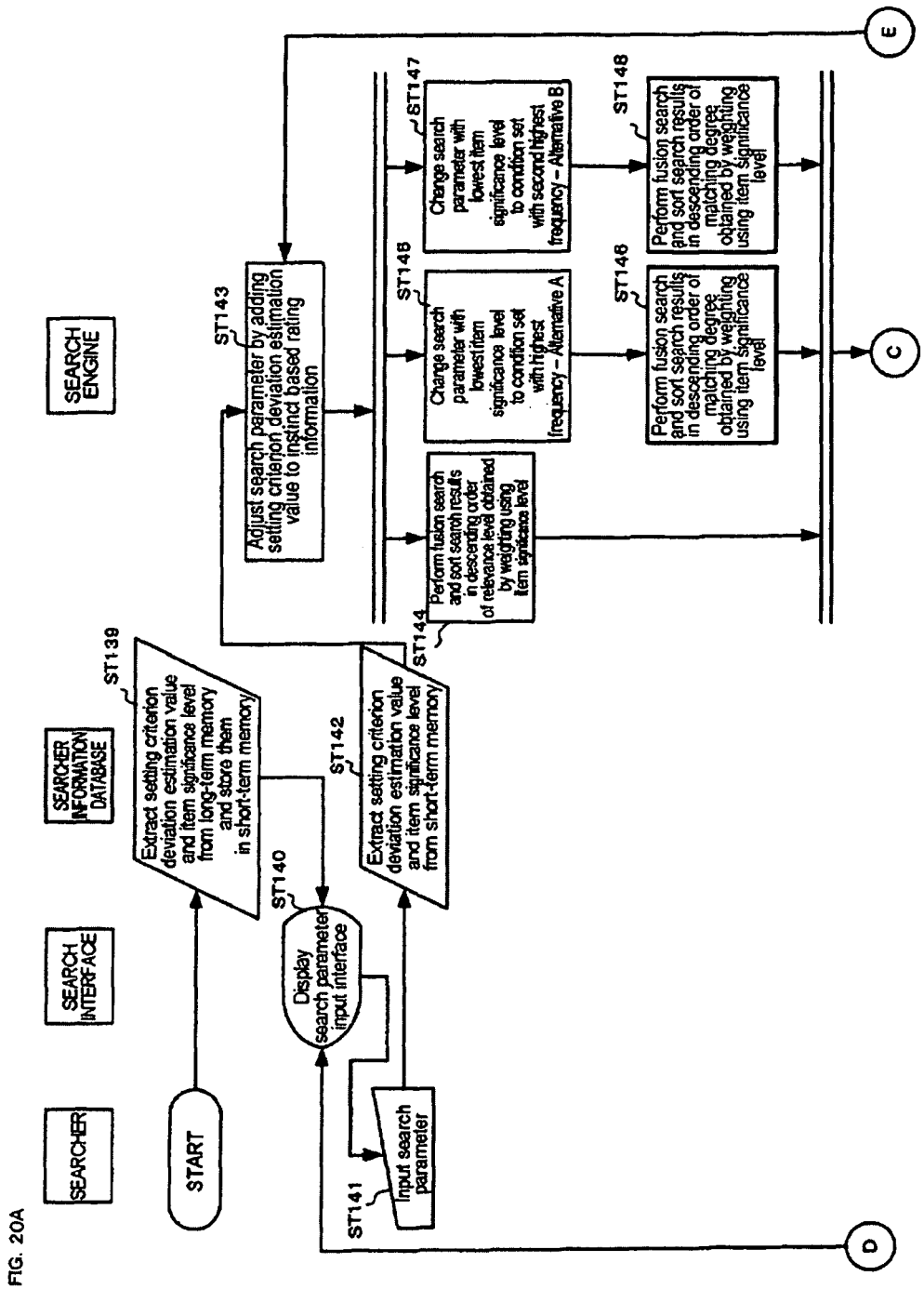
FIG. 20A is the first half of a flowchart showing a perfume search algorithm using repetitive fusion in the perfume search system in the above example.
Figure 20B:
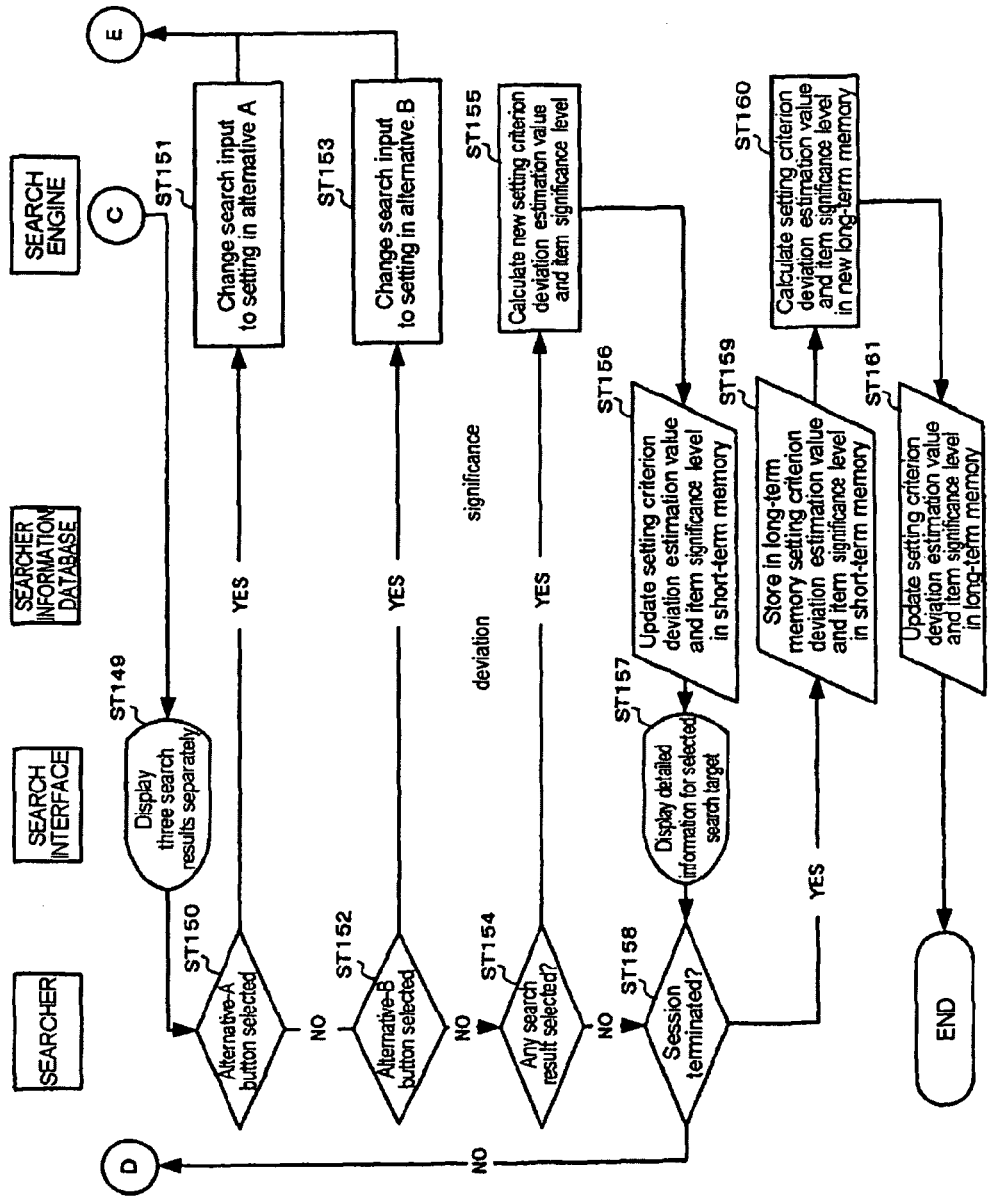
FIG. 20B is the latter half of the flowchart showing the perfume search algorithm using the repetitive fusion in the perfume search system in the above example.

The above perfume search processing will be described below using the flowchart in FIGS. 20A and 20B.

Steps ST139 to ST141: When a user accesses a perfume search site, the database management unit 14 in the server system 10 performs preprocessing for extracting setting criterion deviation estimation values and item significance levels from the long-term memory and storing them in the short-term memory in the searcher information database 12, and displays the search input interface screen 28 in the search parameter input interface 20. When the user inputs various parameters using the search input interface screen 28, the search parameters are transmitted to the server system 10 via the search interface 20.

Steps ST142 to ST144: The search engine 13 in the server system 10 receives the search parameters and extracts the setting criterion deviation estimation values and item significance levels from the short-term memory in the searcher information database 12. The search engine 13 then automatically adjusts the input search parameters by adding the setting criterion deviation estimation values to instinct based rating information in the input search parameters and executes a fusion search. The search engine 13 calculates the deviation of the search value from the setting value of each target, obtains matching degree by weighting using the significance levels, and sorts the targets in descending order of the matching degree.

Steps ST145 to ST148: When receiving the search parameters, the search engine 13 in the server system 10 performs the repetitive fusion search using alternative A in which the search parameter with the lowest item significance level is changed to the condition that has been set with the highest frequency and alternative B in which the search parameter with the lowest item significance level is changed to the condition that has been set with the second highest frequency, calculates the deviation of the parameter value from the setting value of each target, obtains matching degree by weighting using the item significance levels, and sorts the targets in descending order of the matching degree.

Step ST149: The search engine 13 transmits the search results to the search interface 20 and displays the search results obtained using the three different conditions separately. The display this time is as shown in FIG. 19, and the search results from step ST144 are displayed as a main proposal in the search result display field 31, the search results from step ST145 are displayed as alternative A in the search result display field 32, and the search results from step ST147 are displayed as alternative B in the search result display field 33.

Steps ST150 and ST151: If an alternative A button 44 is selected, the search inputs are changed to the search parameter settings for alternative A, and the processing returns to step ST143 and repeats the search.

Steps ST152 and ST153: If the alternative B button 45 is selected, the search inputs are changed to the search parameter settings for alternative B, and the processing returns to step ST143 and repeats the search. If not, the repetitive fusion search is terminated.

Step ST154: If the user selects one of the perfumes extracted as the search results, the selection information is transmitted to the search engine 13 in the server system 10 via the search interface 20. If no perfume is selected, the processing proceeds to ST158.

Steps ST155 to ST157: The search engine 13 calculates a new setting criterion deviation estimation value and item significance level and transmits them to the database management unit 14. Based on the calculation result, the database management unit 14 updates the setting criterion deviation estimation value and item significance levels in the short-term memory for the relevant searcher information in the searcher information database 12. The search engine 13 transmits detailed information for the selected search target to the search interface 20 and displays it in the search interface 20.

Step ST158: If the user checking the displayed search result decides to terminate the session, the user performs the termination operation. On the other hand, if the user decides to continue the search, the user performs the 're-search' operation and returns to step ST140.

Steps ST159 to ST161: If the user commands termination of the session, that command is transmitted from the search interface 20 to the server system 10, and the database management unit 14 stores, in the long-term memory, the setting criterion deviation estimation values and item significance levels in the short-term memory for the relevant searcher information in the searcher information database 12. The search engine 13 calculates a new setting criterion deviation estimation value and significance level in the long-term memory and transmits them to the database management unit 14, and the database management unit 14 updates data in the relevant items in the searcher information database 12.

As described above, the perfume search system in this example makes possible the following:

(i) By storing and accumulating search system usage histories for each searcher, the more a searcher uses the system, the more accurately the system can understand the searcher's tendency, and so the system can propose the most suitable search targets to the searcher.

(ii) The usage histories of the search system are sorted into short-term history and long-term history for each searcher, and the search system reads long-term characteristics as the searcher's unchanged tendency from the long-term history and short-term characteristics as the searcher's recent tendency from the short-term history. The search system proposes the most suitable search result to the searcher based on the long-term characteristics and short-term characteristics.

(iii) By identifying, from the searcher information, the deviation of a searcher's own criterion from a criterion defined by the system in the instinct based search using multiple numerical value parameters, the system automatically adjusts a search parameter.

(iv) By identifying the searcher's significance level for each search item from the searcher information in a compound search using multiple search items, the search system proposes the most suitable target to the searcher. In this case, even if there is no target matching with the input search values, the system can always display a relevant target by automatically relaxing search conditions, starting from the item with the lowest significance level. Also, the system proposes a search target the search item with the highest significance level matches even when other items do not match the search target.

(v) The search system displays questions to the searcher together with the search results and observes the searcher's reaction to these questions, and by repeating this communication, the system displays a target desired by the searcher.

(vi) The search system searches for searchers who have similar characteristics from the searcher information database 12 and proposes targets searched for by those searchers. For example, if the searchers are more likely to select articles of the same manufacturer, the system asks the searchers: "Some articles from this manufacturer have been found. Do you want them to be displayed?" to check the searchers' preference, and proposes information suitable for each searcher (user). By weighting and storing information indicating the search target has been clicked, the system can further improve its accuracy. For example, if weighting is performed in an online shop, by giving points to "purchase," "information request" and "click" respectively by 10:5:1, the system can reflect the actual status more accurately.

What is claimed is:

1. A repetitive fusion search system comprising:
    a search target database that is configured to store information about targets to be searched for;
    a searcher information database that is configured to store information about a searcher;
    a search interface of a computing system that is configured to display a parameter numerical value setting field configured to receive one or more numerical values for one or more instinct based search parameters and a keyword input field configured to receive one or more keywords, wherein the search interface is also configured to receive, from the searcher, input information that includes at least a keyword and a numerical value corresponding to at least one instinct based search parameter to be used for a search, and wherein the search interface is further configured to display the input information and a search result;
    a search engine that is configured to search the search target database and the searcher information database based on the input information, wherein the search engine is also configured to extract one or more relevant targets, determine a priority of the one or more relevant targets based at least on the numerical value corresponding to the at least one instinct based search parameter, and transmit the one or more relevant targets as the search result to the search interface, and wherein, in response to a selection of a search target by the searcher, the search engine is further configured to estimate, based on a deviation of a search parameter set for the selected search target from the numerical value in the input information, an instinct based search parameter setting criterion deviation for the at least one instinct based search parameter associated with the selected search target; and
    a database management unit that is configured to manage entering and updating of data in the search target database and the searcher information database.

2. The repetitive fusion search system according to claim 1, wherein the search engine is further configured to:
    perform a first search based on a first instinct based search parameter with a highest search parameter significance level for which a numerical value is not entered by the searcher in the search interface, to extract a first relevant target as a result of the first search, and to provide the first relevant target as a first alternative for the search result to the search interface; and
    perform a second search based on a second instinct based search parameter with a second highest search parameter significance level for which a numerical value is not entered by the searcher in the search interface, to extract a second relevant target as a result of the second search, and to provide the second relevant target as a second alternative for the search result.

3. The repetitive fusion search system according to claim 1, wherein:
    the searcher information database is configured to store a history of input information and target selections received from the searcher; and
    the search engine is configured to estimate, with respect to the input information input by the searcher, search tendency information for the at least one instinct based search parameter and a search parameter significance level based on the history of input information, wherein the search engine is also configured to search the search target database by adjusting the input information using the estimation result or by adjusting a matching degree calculation between the input information and the one or more relevant targets.

4. The repetitive fusion search system according to claim 3, wherein, in response to a selection of a search target by the searcher, the search engine is configured to determine a match rate between a search parameter associated with the selected search target and the at least one instinct based search parameter for which the numerical value was included in the input information, and wherein the search engine is configured to estimate a search parameter significance level for the search parameter based on the match rate.

5. The repetitive fusion search system according to claim 3, wherein the search engine is configured to obtain a search input distribution for the searcher based on the history of input information for the searcher and to set a significance level for the at least one instinct based search parameter based on a size of the search input distribution.

6. The repetitive fusion search system according to claim 3, wherein the search engine is configured to obtain an input percentage for each search input for the searcher based on the history of input information for the searcher and to identify a preferred search input for the searcher based on the input percentage.

7. The repetitive fusion search system according to claim 3, wherein the search engine is configured to identify search parameters set for search targets selected in the past based on the history of input information for the searcher and to identify a search input as a preference search input based on the identified search parameters.

8. The repetitive fusion search system according to claim 3, wherein the search engine is configured to store information regarding a search session in a short-term memory until the search session ends, and wherein the search engine is configured to store the information for the search session in a long-term memory when the search session ends.

9. The repetitive fusion search system according to claim 8, wherein the search engine is configured to estimate searcher tendency information based on the information for the search session stored in the long-term memory.

10. The repetitive fusion search system according to claim 3, wherein:
the search engine is configured to obtain, in response to a selection of a search target in the search interface, a setting criterion deviation of the numerical value received for the at least one instinct based search parameter for the search target from a set value for the at least one instinct based search parameter, and to store the setting criterion deviation for the at least one instinct based search parameter in the searcher information database; and
the search engine is configured to correct a newly-input numerical value setting for the at least one instinct based search parameter based on the setting criterion deviation, and to search the search target database with the corrected numerical value setting for the at least one instinct based search parameter as a search condition.

11. The repetitive fusion search system according to claim 3, wherein:
the search engine is configured to calculate a matching degree for each of the one or more relevant targets by weighting, by the search parameter significance level, deviation of the input information from instinct based search parameters set for the one or more relevant targets, wherein the search engine is also configured to sum weighted deviations and display in the search interface the one or more relevant targets in descending order of the matching degree.

12. The repetitive fusion search system according to claim 3, wherein, if no search target matches the input information, the search engine is configured to repeat searches by relaxing search conditions, starting from an instinct based search parameter with a lowest search parameter significance level.

13. The repetitive fusion search system according to claim 3, wherein the search engine is configured to obtain a past search tendency for the searcher based on the history of input information for the searcher, to receive a response from the searcher regarding the search result, and to update the past search tendency of the searcher based on the response.

14. The repetitive fusion search system according to claim 3, wherein the search engine is configured to obtain an input percentage for each search input based on the history of input information for the searcher, to identify a search input with a highest input percentage as a preferred search input for the searcher, and to search the search target database using the preferred search input.

15. The repetitive fusion search system according to claim 3, wherein the search engine is configured to learn how the searcher configures search settings during one or more search sessions and to identify a search condition setting with a highest usage frequency, and wherein the search engine is configured to search the search target database based on the search condition setting with the highest usage frequency.

16. The repetitive fusion search system according to claim 3, wherein the search engine is configured to receive a preference set by the searcher with reference to a search situation, and to search the search target database based on the preference.

17. The repetitive fusion search system according to claim 3, wherein:
the search engine is configured to divide features of a search target into multiple instinct based search parameters, and to display in the search interface a parameter numerical value setting field for each of the multiple instinct based search parameters, wherein the search engine is configured to receive, for each of the multiple instinct based search parameters, a value set in the parameter numerical value setting field in the search interface by the searcher;
the search engine is configured to determine a deviation of the value for each instinct based search parameter set by the searcher from a setting criterion value for each instinct based search parameter in the system based on the history of input information from the searcher;
the search engine is configured to obtain a corrected numerical value for each instinct based search parameter by correcting the deviation of the value for each instinct based search parameter set by the searcher from the setting criterion value for each instinct based search parameter in the system; and
the search engine is configured to search the search target database using the corrected search numerical value for each instinct based search parameter.

* * * * *

UNITED STATES PATENT AND TRADEMARK OFFICE
CERTIFICATE OF CORRECTION

PATENT NO. : 8,972,370 B2  
APPLICATION NO. : 12/196086  
DATED : March 3, 2015  
INVENTOR(S) : Tsuruta et al.

Page 1 of 1

It is certified that error appears in the above-identified patent and that said Letters Patent is hereby corrected as shown below:

Specification

In Column 1, Lines 38-39, delete "customers" and insert -- customer's --, therefor.

In Column 4, Line 52, delete "searchers" and insert -- searcher's --, therefor.

In Column 5, Line 29, delete "selling" and insert -- setting --, therefor.

In Column 5, Line 55, delete "users" and insert -- user's --, therefor.

In Column 5, Line 64, delete "users" and insert -- user's --, therefor.

In Column 7, Line 64, delete "searchers" and insert -- searcher's --, therefor.

In Column 8, Line 49, delete "searchers" and insert -- searcher's --, therefor.

In Column 12, Line 25, delete "total on the" and insert -- total of) the --, therefor.

Signed and Sealed this  
Thirteenth Day of October, 2015

Michelle K. Lee  
*Director of the United States Patent and Trademark Office*